(12) United States Patent
Orebaugh

(10) Patent No.: US 10,060,176 B1
(45) Date of Patent: Aug. 28, 2018

(54) FLOOR MOUNTED OR VEHICLE MOUNTED SAFE

(71) Applicant: Jeffrey Orebaugh, Centre, AL (US)

(72) Inventor: Jeffrey Orebaugh, Centre, AL (US)

( * ) Notice: Subject to any disclaimer, the term of this patent is extended or adjusted under 35 U.S.C. 154(b) by 0 days.

(21) Appl. No.: 15/598,491

(22) Filed: May 18, 2017

(51) Int. Cl.
| | | |
|---|---|---|
| *E05B 1/02* | (2006.01) | |
| *E05G 1/00* | (2006.01) | |
| *E05G 1/06* | (2006.01) | |
| *E05G 1/04* | (2006.01) | |
| *E05G 1/024* | (2006.01) | |
| *E05G 1/026* | (2006.01) | |
| *B60R 7/08* | (2006.01) | |

(52) U.S. Cl.
CPC ............ *E05G 1/005* (2013.01); *E05G 1/024* (2013.01); *E05G 1/026* (2013.01); *E05G 1/04* (2013.01); *E05G 1/06* (2013.01); *B60R 7/087* (2013.01)

(58) Field of Classification Search
CPC .. E05G 1/00; E05G 1/005; E05G 1/02; E05G 1/024
See application file for complete search history.

(56) References Cited

U.S. PATENT DOCUMENTS

| | | | | |
|---|---|---|---|---|
| 4,373,450 A | * | 2/1983 | Miller | E05G 1/024 109/75 |
| 4,569,294 A | * | 2/1986 | Beattie | E05G 1/026 109/24 |
| 4,852,503 A | * | 8/1989 | Lichter | E05G 1/00 109/59 R |
| 5,035,187 A | * | 7/1991 | McGunn | E05G 1/00 109/46 |
| 5,152,231 A | * | 10/1992 | Preston | E05G 1/024 109/65 |
| 5,479,341 A | * | 12/1995 | Pihl | G06F 21/86 340/542 |
| 5,970,889 A | * | 10/1999 | Shaffer | E05G 1/024 109/65 |
| 6,871,602 B2 | * | 3/2005 | McCracken | E05B 65/0075 109/24.1 |
| 7,350,470 B1 | * | 4/2008 | Stuhlbarg | E05D 7/14 109/73 |
| 9,482,042 B2 | * | 11/2016 | Boyes | E05G 1/026 |

* cited by examiner

*Primary Examiner* — Christopher J Boswell

(57) ABSTRACT

A floor mounted safe used for providing safe and security for ones valuables at home, office, condo or mobile vehicle while traveling. The inventive device utilizes an all steel box construction, has sub frame, inner and outer framework, inner and outer shell for strength, removable all steel doors, solid brass and stainless steel handles, removable drawer, seven point locking system. Electronic and mechanical locking system. Has custom paint with clear coat and solid stainless steel rivets and pin stripes for old style looks.

9 Claims, 31 Drawing Sheets

FLOOR MOUNTED OR VEHICLE MOUNTED SAFE

FIELD OF INVENTION

The present invention relates to safes and/or vaults. More specifically relates to the under bed or hideaway style safe for hiding valuables and keeping them secure.

SUMMARY

The primary design is appropriate for fitting or hiding away under a bed or can be mounted in the rear of SUV, Truck, Camper for traveling purposes and security.

Another object is that it is made from all metal components for durability and secure structure. Unlike the rest, has an internal framework for a stronger structural design.

Another object is all components are brass, copper, cold roll steel or stainless steel except for the actual wheel material, which is a high temp urethane.

Another object is the track system is all steel and welded into position and will not have to be replaced like most on the market.

Another object is all mechanical components can be repaired and/or replaced when worn or damaged.

Another object very secure for keeping valuables safe and weapons out of harm way of children and the criminal elements, as well as keeping contents safe and secure.

Other objects of this design will become more clear or obvious to the reader upon inspection of said drawings referred to in this construction of said safe design.

BRIEF DESCRIPTION OF THE DRAWINGS

Various other specs, features and advantages of the present invention will become more appreciated and a better understanding will be considered by viewing the accompanying drawings and descriptions of the same.

DRAWINGS

Figure 1:
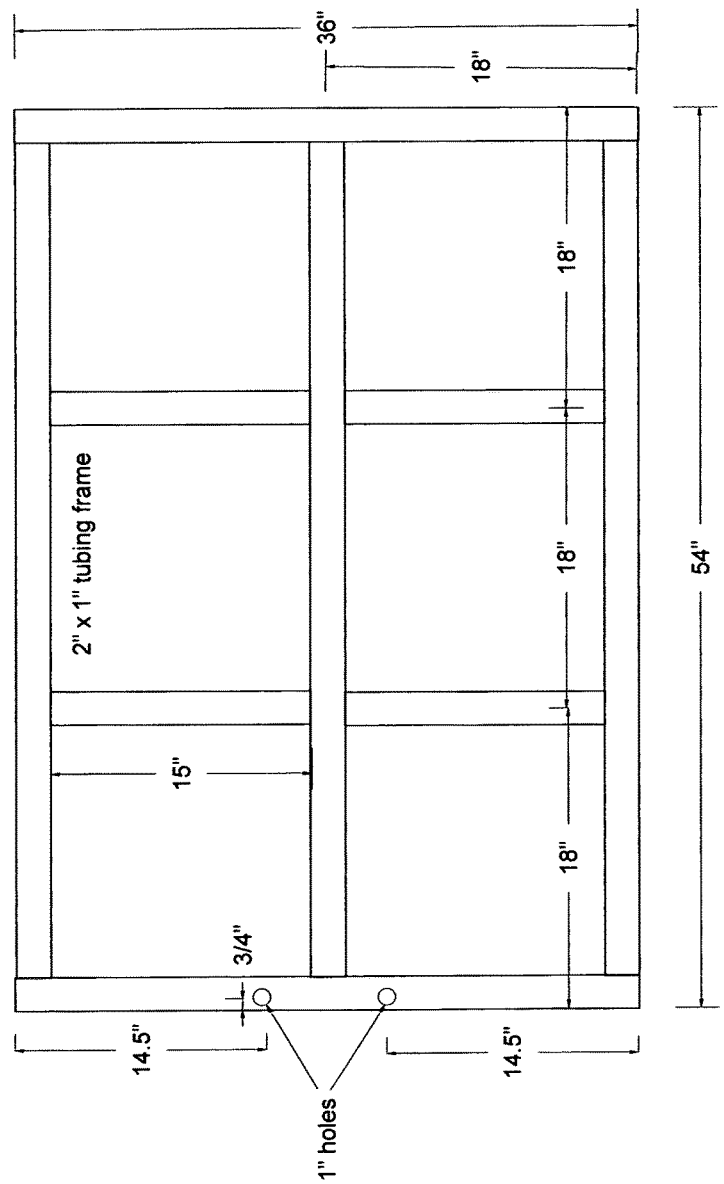
FIG. 1—Top view of internal top section sub framework
FIG. 2—Bottom view of internal bottom section sub framework
FIG. 3—Side view and rear view of internal sides and rear section sub framework
FIG. 4—Top and end view of outer top section and side sections of external shell
FIG. 5—Bottom, side and rear panel on internal shell
FIG. 6—Bottom and rear external shell
FIG. 7—FourTrack internal drawer track design
FIG. 8—Inner drawer stops
FIG. 9—Bottom, sides and end piece of inner drawer
FIG. 10—Inner top shell
FIG. 11—Inner drawer framework locations
FIG. 12—Location of hole drilling for inner drawer wheels
FIG. 13—Location view of outer framework
FIG. 14—Location of steel rivets drilling holes
FIG. 15—Inner drawer wheel and stops locations
FIG. 16—Left door inner lock cam
FIG. 17—Right door inner lock cam
FIG. 18—Right outer door keypad holes locations
FIG. 19—Inner door skins
FIG. 20—Bullet proof door hinges and location of hinge plates
FIG. 21—Right door frame, cam and lock
FIG. 22—Left door frame, cam and cam lock
FIG. 23—Front of drawer handle, handle base and handle
FIG. 24—Outer door handle center turrets
FIG. 25—Outer door skins
FIG. 26—Bullet shaped door handle
FIG. 27—Door assembly view
FIG. 28—Wheel assembly view
FIG. 29—Locking pins and sleeves
FIG. 30—Cam lock for left door
FIG. 31—Cutaway view of door cam, bushings and spacers

FIG. 1—Made from 2"×1"×14 g steel tubing cut to specified lengths and mig welded into place. Specified dimensions must be precise. Holes for door pin locks (refer to FIG. 29) drilled in specified locations and sleeves welded into place from the outer side and ground smooth.

Figure 2:
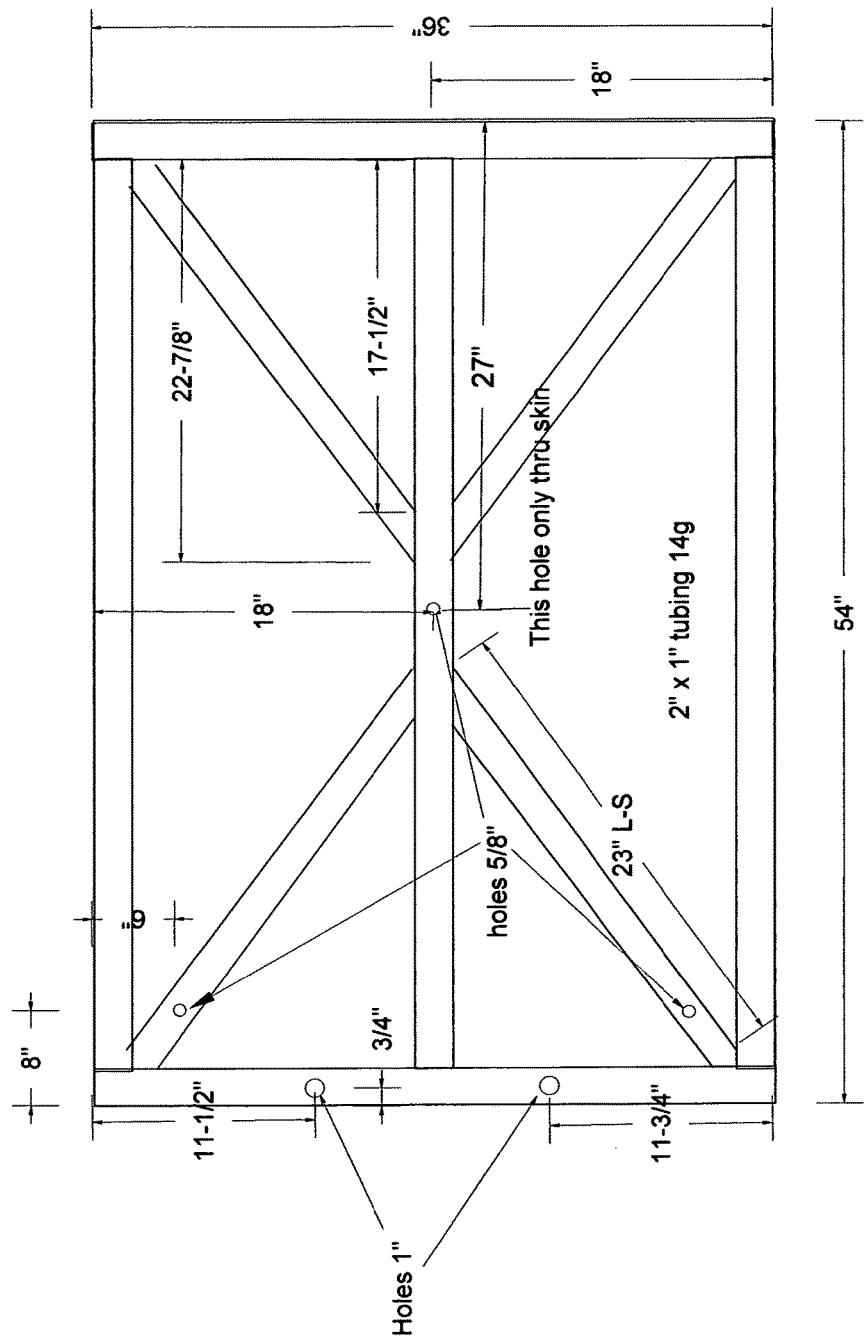

FIG. 2—Made from 2"×1"×14 g steel tubing cut to specified lengths and mig welded into place. Specified dimensions must be precise. Holes for door pin locks (refer to FIG. 29) and anchor hole locations drilled in specified locations. Sleeves welded into place from outer side and ground smooth.

Figure 3:
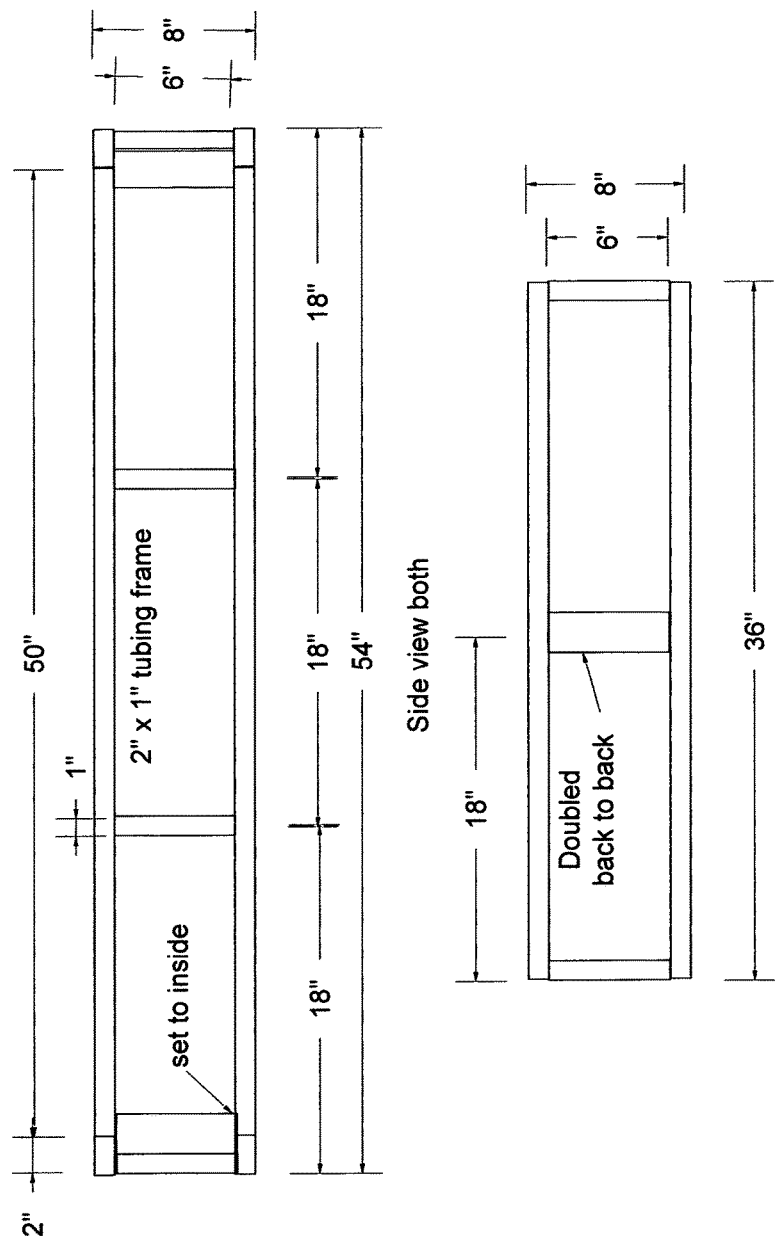

FIG. 3—Made from 2"×1"×14 g steel tubing cut to specified lengths and mig welded into place. Cut 5 pieces of 2"×1"×14 g tubing to 6" lengths for upright support pieces. By specified locations doubled in rear corners for strength, weld on to top of bottom of sub frame, one welded at center location and doubled at front corners of bottom sub frame with one facing forward for hinge plate locations and one at 90 degrees to rear facing for support. All support pieces at are 90 degrees square to bottom sub frame. Weld three upright support pieces at each end and center of rear bottom sub frame, all 90 degree square to frame.

Figure 4:
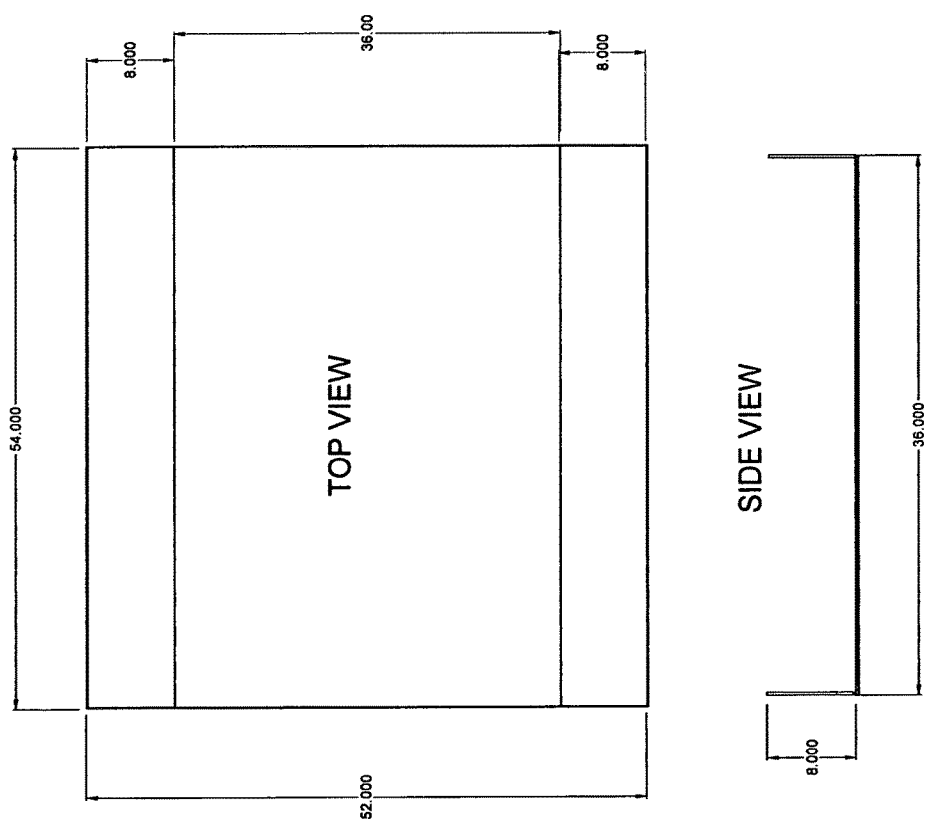

FIG. 4—Made from 18 g cold roll steel sheet and cut and shaped to specified lengths. Once cut in specified length and width, bend at 90 degree and set aside for later assembly.

Figure 5:
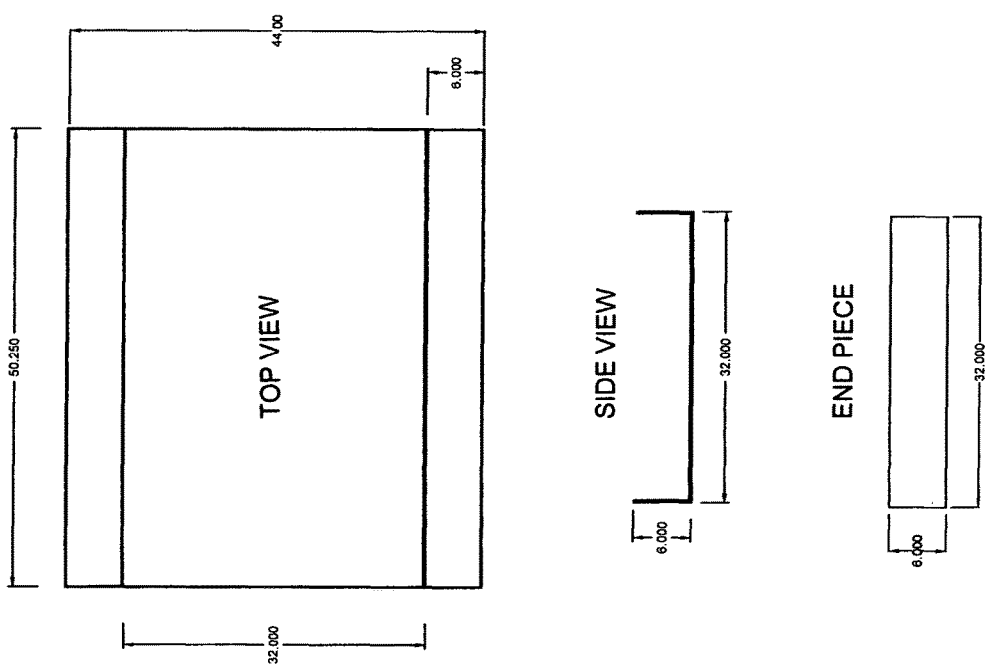

FIG. 5—Cut from 18 g cold roll steel sheet and shaped to specified lengths. Once cut to specified lengths and widths bend sides at 90 degree angles to bottom at specified dimensions and weld into place inside sub frame (FIGS. 3 and 4). Weld in rear panel to rear inner wall (FIG. 3).

Figure 6:
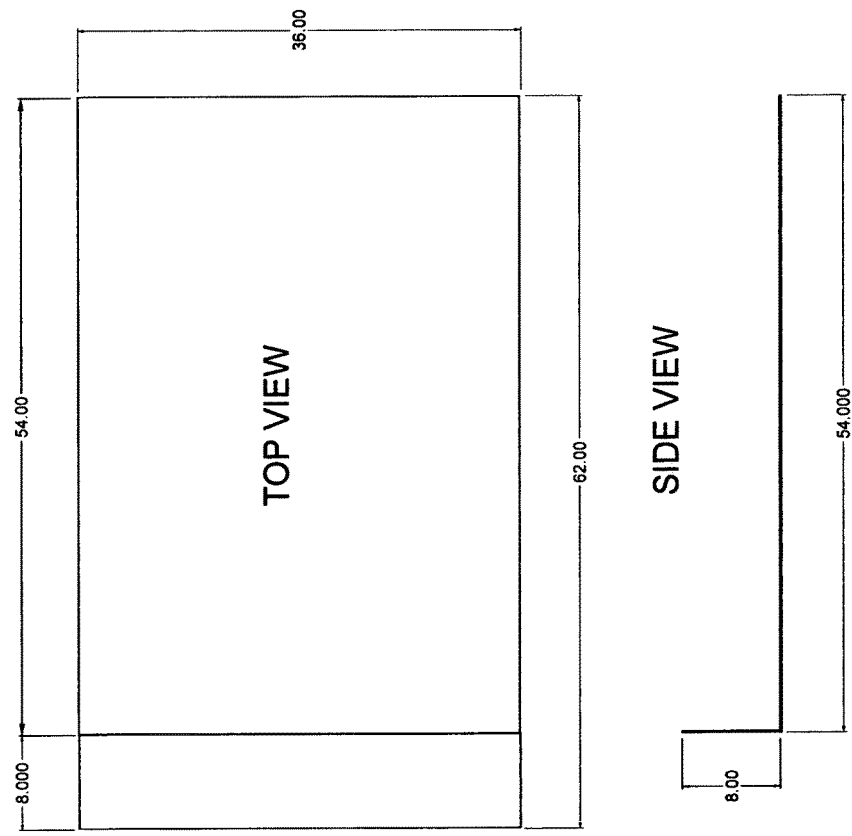

FIG. 6—Cut from 18 g cold roll steel sheet and shaped to specified lengths. Once cut to specified lengths and widths, bend at 90 degrees and set aside for later assembly.

Figure 7:
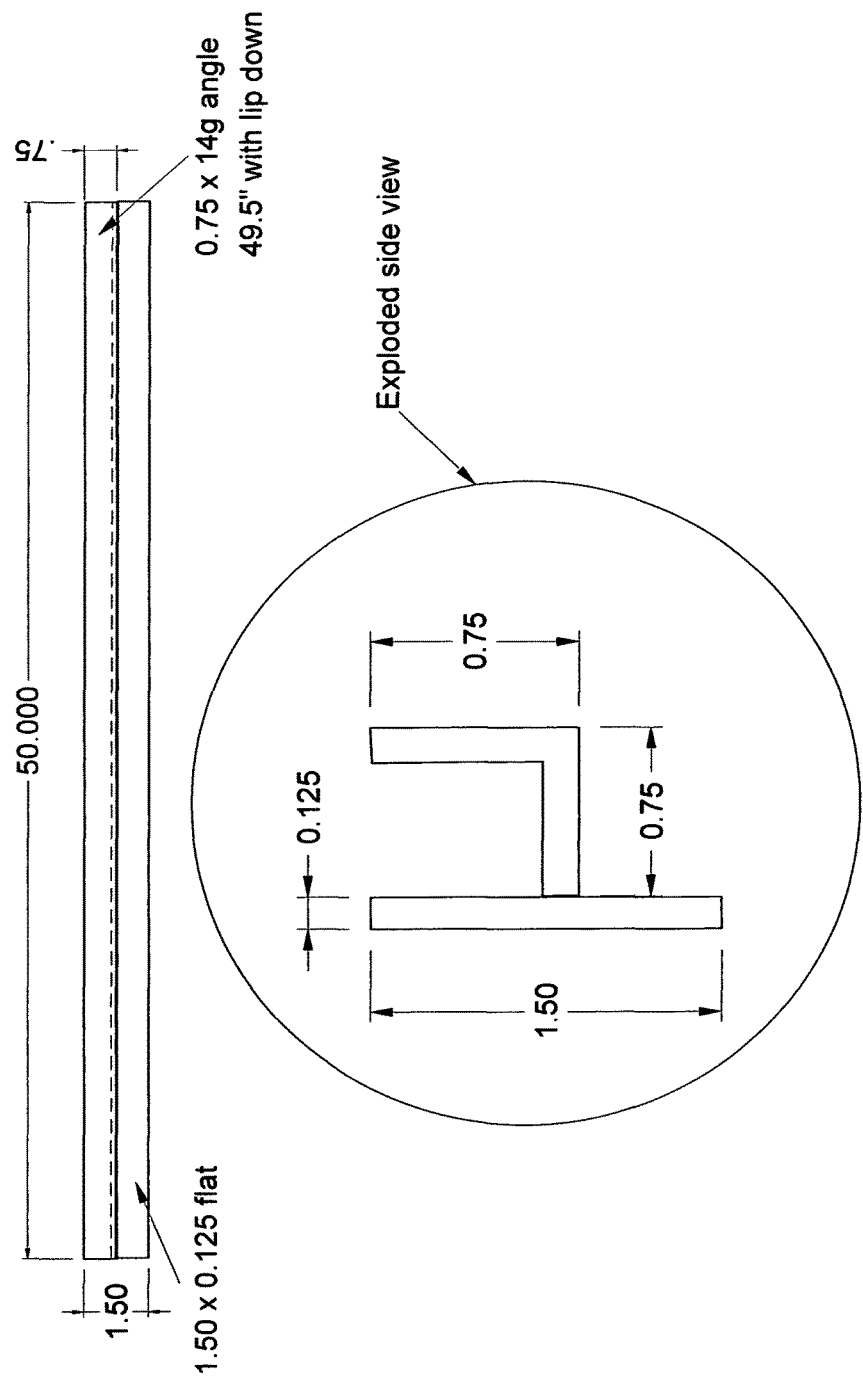

FIG. 7—Made from ¾"×¾"×14 g steel angle iron cut to specified lengths with 1¼"×⅛" flat bar. Once both pieces are cut to specified dimensions, angle iron is welded at 90 degrees onto flat bar at specified location. Place FourTrack onto inner side skin (FIG. 5) at proper dimension and weld into place. Must be precise.

Figure 8:
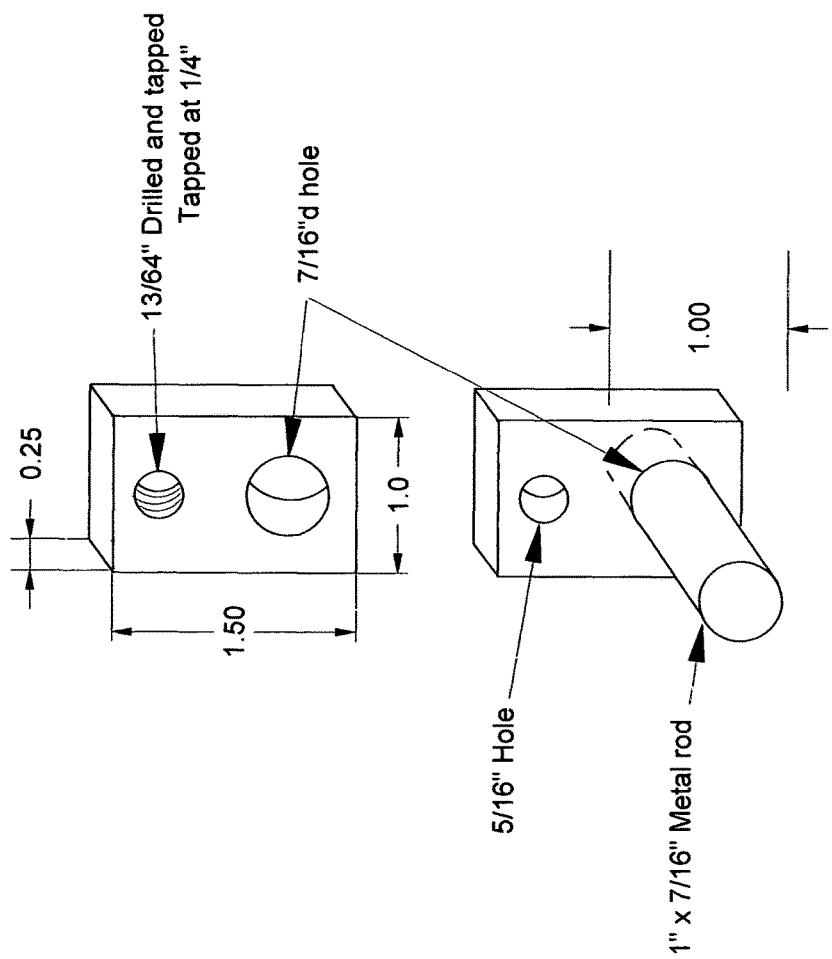

FIG. 8—Made from 1"×¼" flat steel and $\frac{7}{16}$" steel rod. Once cut two holes drilled for allen bolt and one for stop rod to be placed in. Allen bolt hole in piece to be welded onto drawer (FIG. 15) is to be drilled at $\frac{13}{64}$" and tapped at ¼"-20 and bottom hole is to drilled at $\frac{7}{16}$" for 1"×$\frac{7}{16}$" round stop rod. Top piece is welded into place in pre determined location (refer to FIG. 15). Bottom piece is drilled at $\frac{13}{64}$" top hole, no threads, and bottom hole is drilled at $\frac{7}{16}$" for $\frac{7}{16}$"×1" steel round rod to be welded into at 90 degrees and inserted into place and ¼" allen head ½" stainless bolt secures it into place once drawer is pushed into position. Set aside until drawer is built and assembled.

Figure 9:
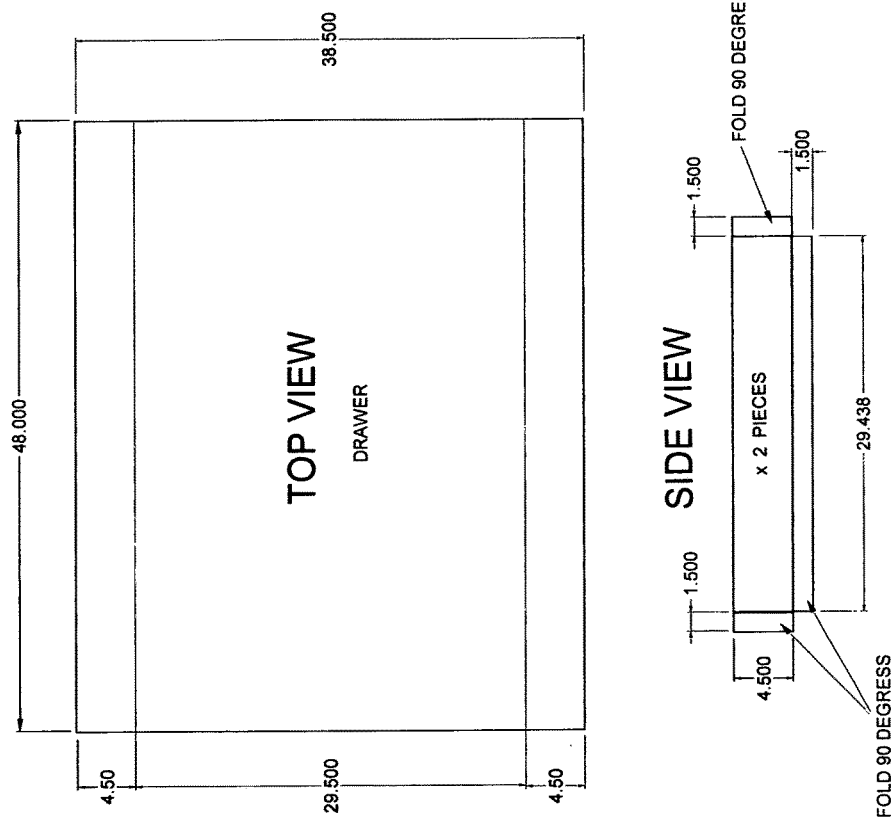

FIG. 9—Made from 18 g cold roll steel sheet metal and shaped to specified lengths. Once bent at 90 degrees for both sides, end pieces with 90 degrees ear tabs inserted into place and welded. ½"×½"×14 g angle is placed at proper dimensions (FIG. 11) and welded into place. Once welded in all areas, drawer is marked at specified locations (FIG. 15) for wheels and drawer stop locations.

Figure 10:
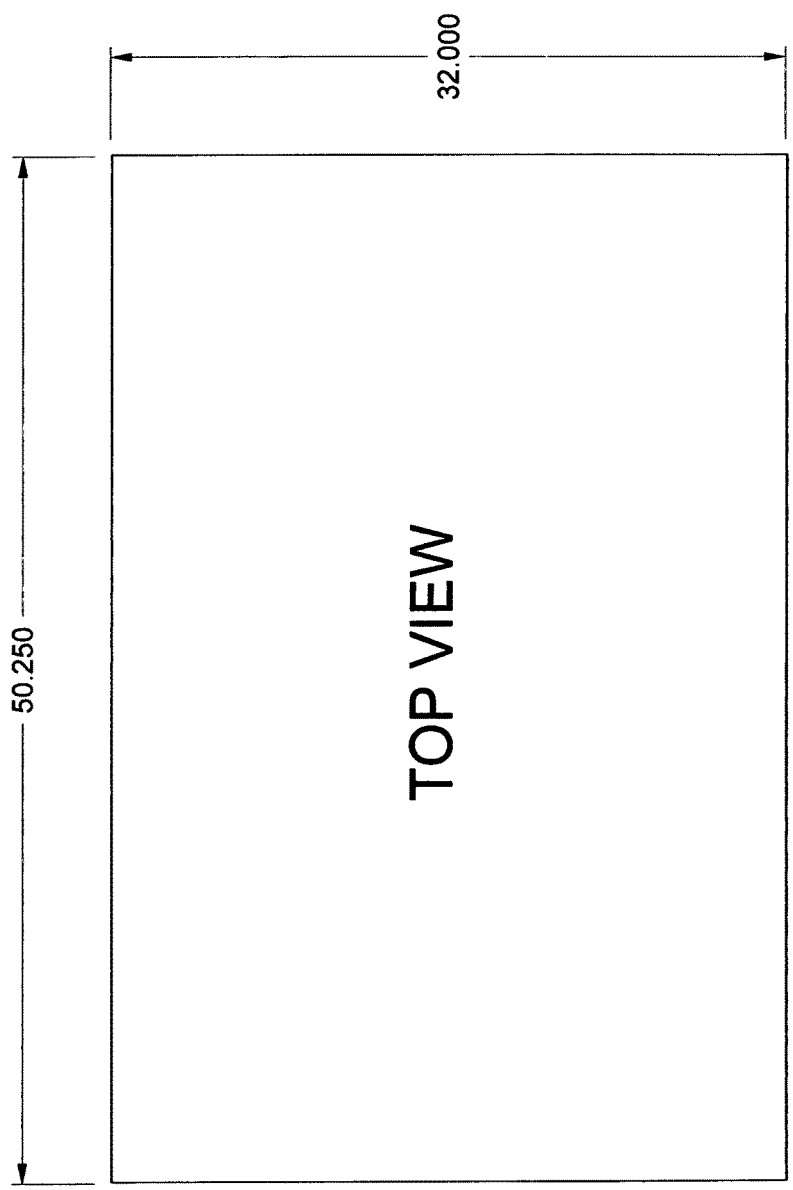

FIG. 10—Made from 18 g cold roll sheet metal, cut and welded to specified area of inner portion of top sub frame (FIG. 1). Must only overlap front portion of sub frame by ¼" not to interfere with locking pin sleeve holes. Assemble top sub frame with inner shell attached to bottom, rear and side assembly of safe box construction (FIGS. 2 and 3). Assemble outer top and side shell (FIG. 4) and place onto box assembly (FIGS. 2 and 3) and tack weld into place. Assemble bottom and rear outer shell and place onto bottom and rear section of box assembly (FIGS. 2 and 3) and tack weld into place.

Figure 11:
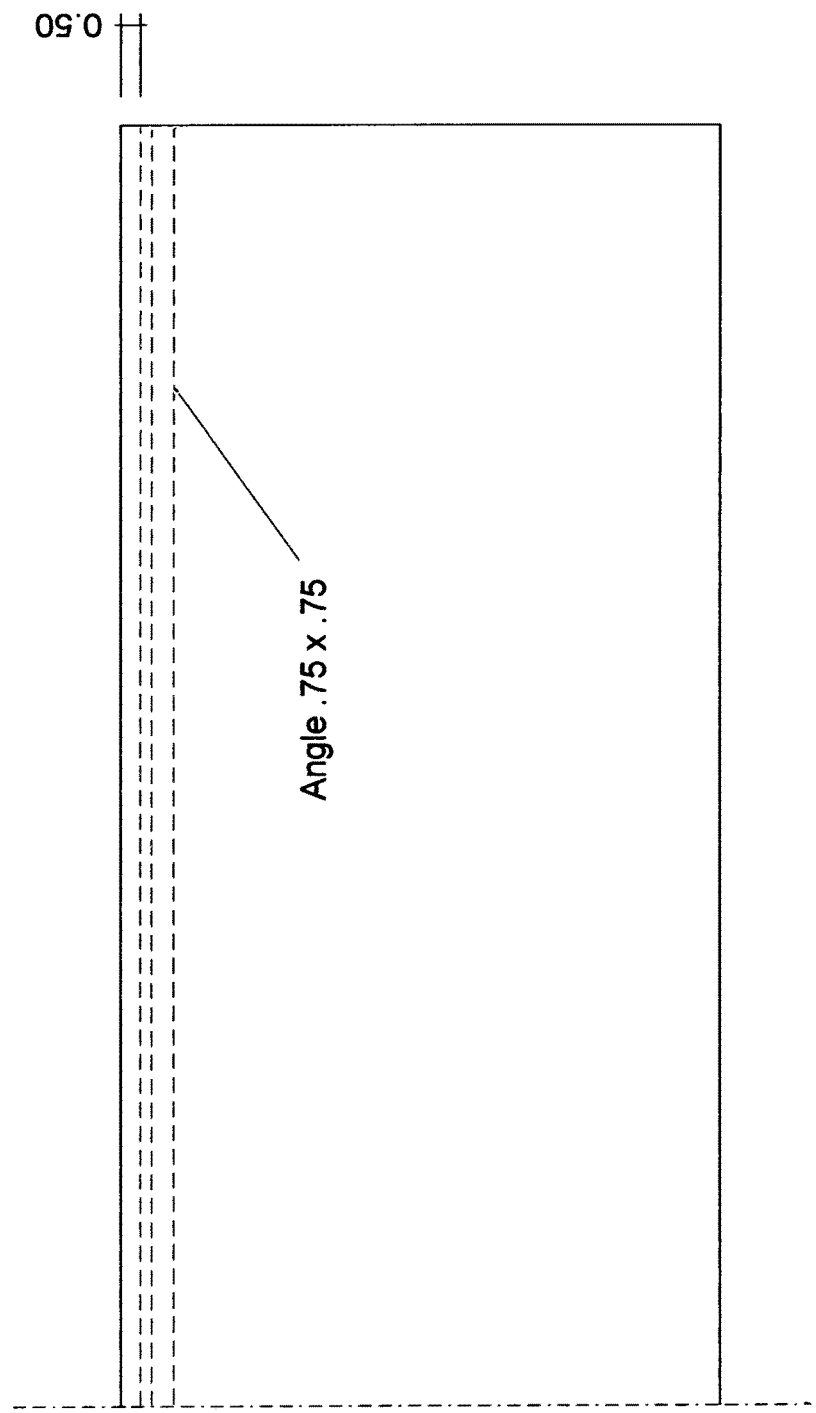

FIG. 11—Inner drawer framework locations. Made from ½"×½"×14 g steel angle iron cut to specified lengths and mig welded into place. Located on all four sides of drawer (refer to FIG. 9). Gives strength for locations of wheels (see FIG. 15)

Figure 12:
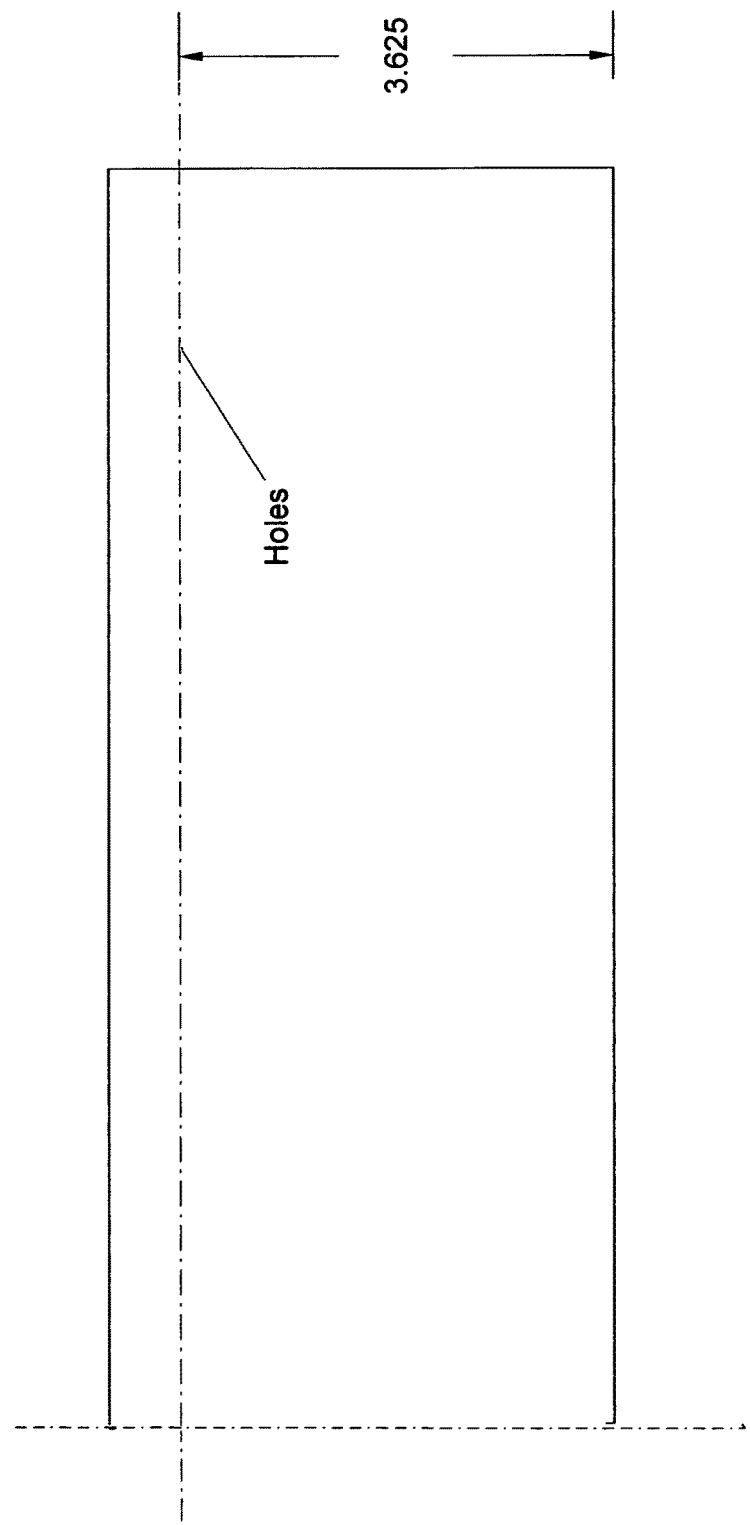
Figure 15:
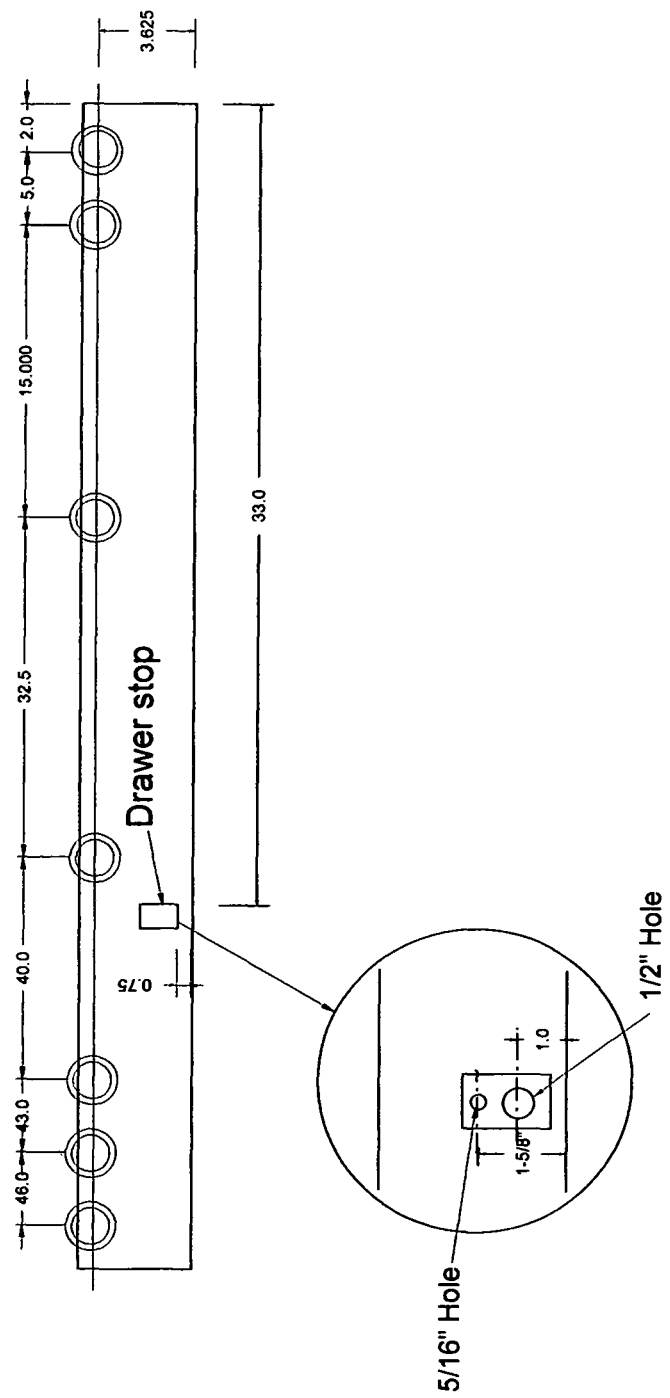

FIG. 12—Location view of holes in drawer (FIG. 9) to be drilled for wheels (see FIG. 15).

Figure 13:
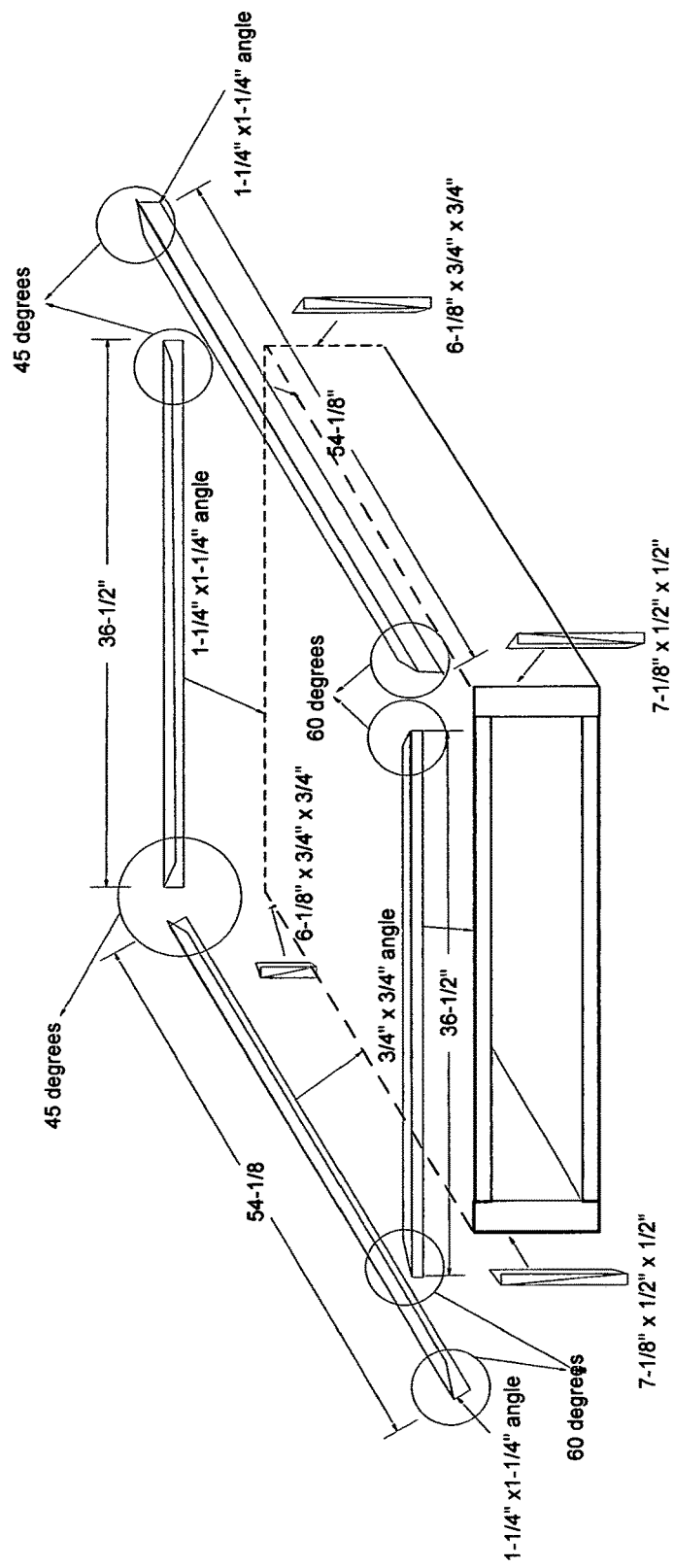

FIG. 13—Made from 1¼"×1¼"×14 g cut at 45 degrees on back corners and 60 degrees at front corners welded into place at joints and tacked onto outer shell top and bottom (FIGS. 2,3,10) at every 6". ½"×½"×14 g steel angle iron cut at 7⅛" and welded at front corner sides over lapping top and bottom frame pieces at ½" at specified dimensions and mig welded into place. ¾"×¾"×14 g steel angle cut at 6⅛" and welded at rear corners set inside top and bottom frame pieces and welded at joints.

Figure 14:
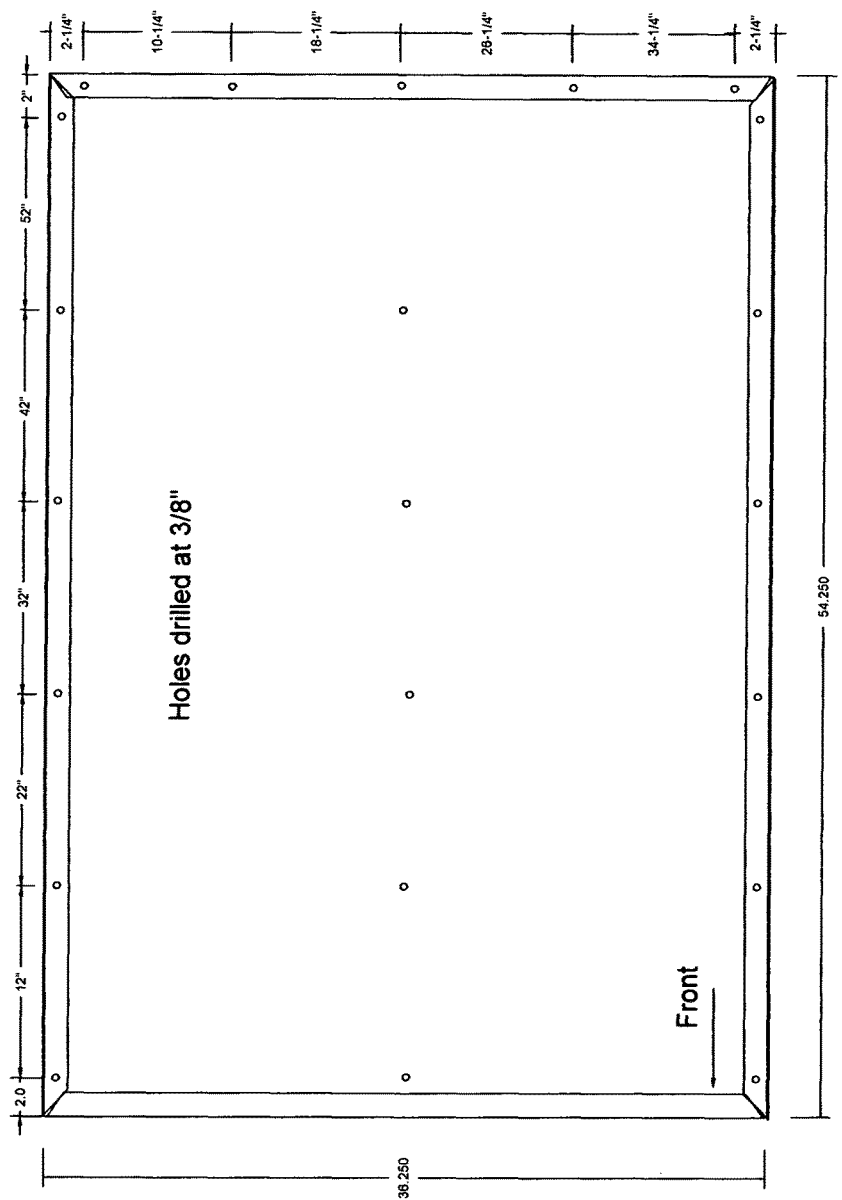

FIG. 14—Drilled at ⅜" at specified locations at a depth not exceeding ½", cleaned and prepped for stainless rivet hammered into place for cosmetic and structure purposes after base color paint applied and before clear coat applied.

FIG. 15—Holes drilled at ¼" for wheels and ⁵⁄₁₆" and ½" for stop. Once drilled at stop, piece (see FIG. 8) welded into place and wheel assemblies (see FIG. 28) put into place.

Figure 16:
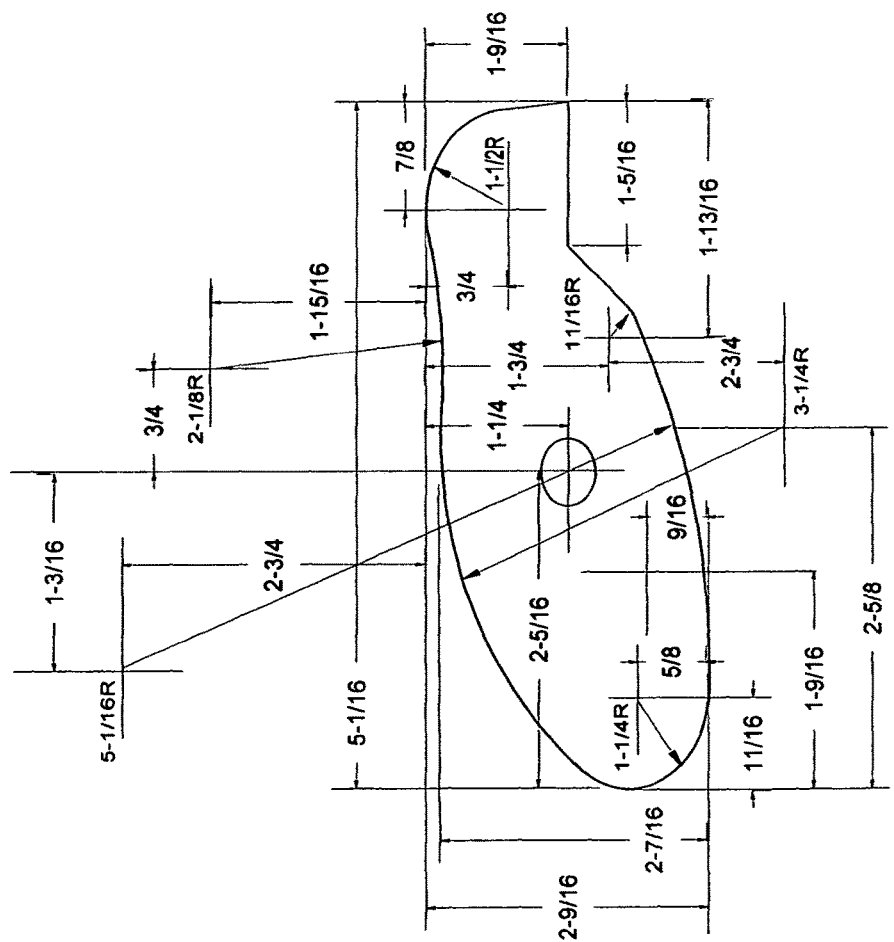
Figure 22:
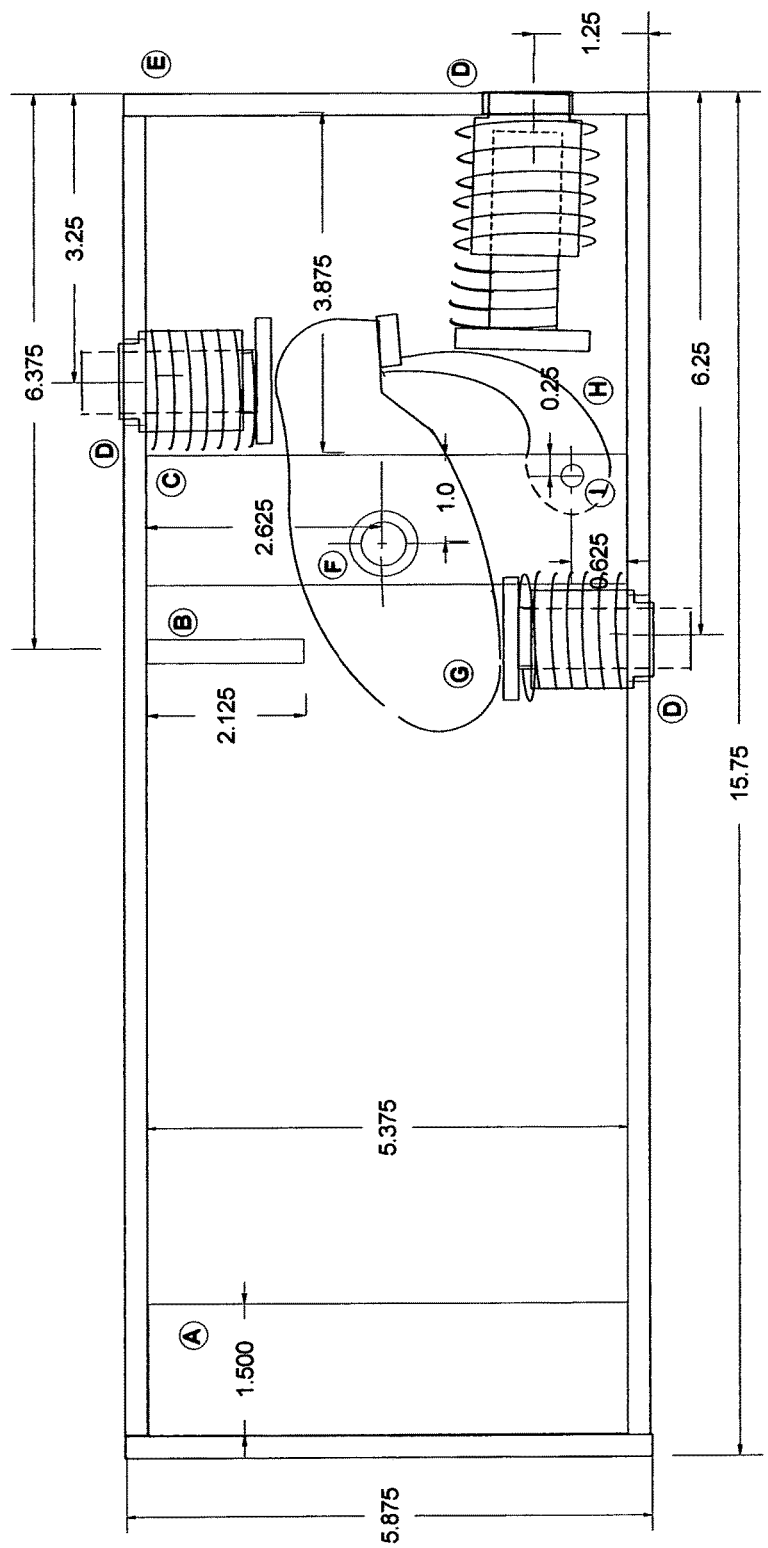
Figure 31:
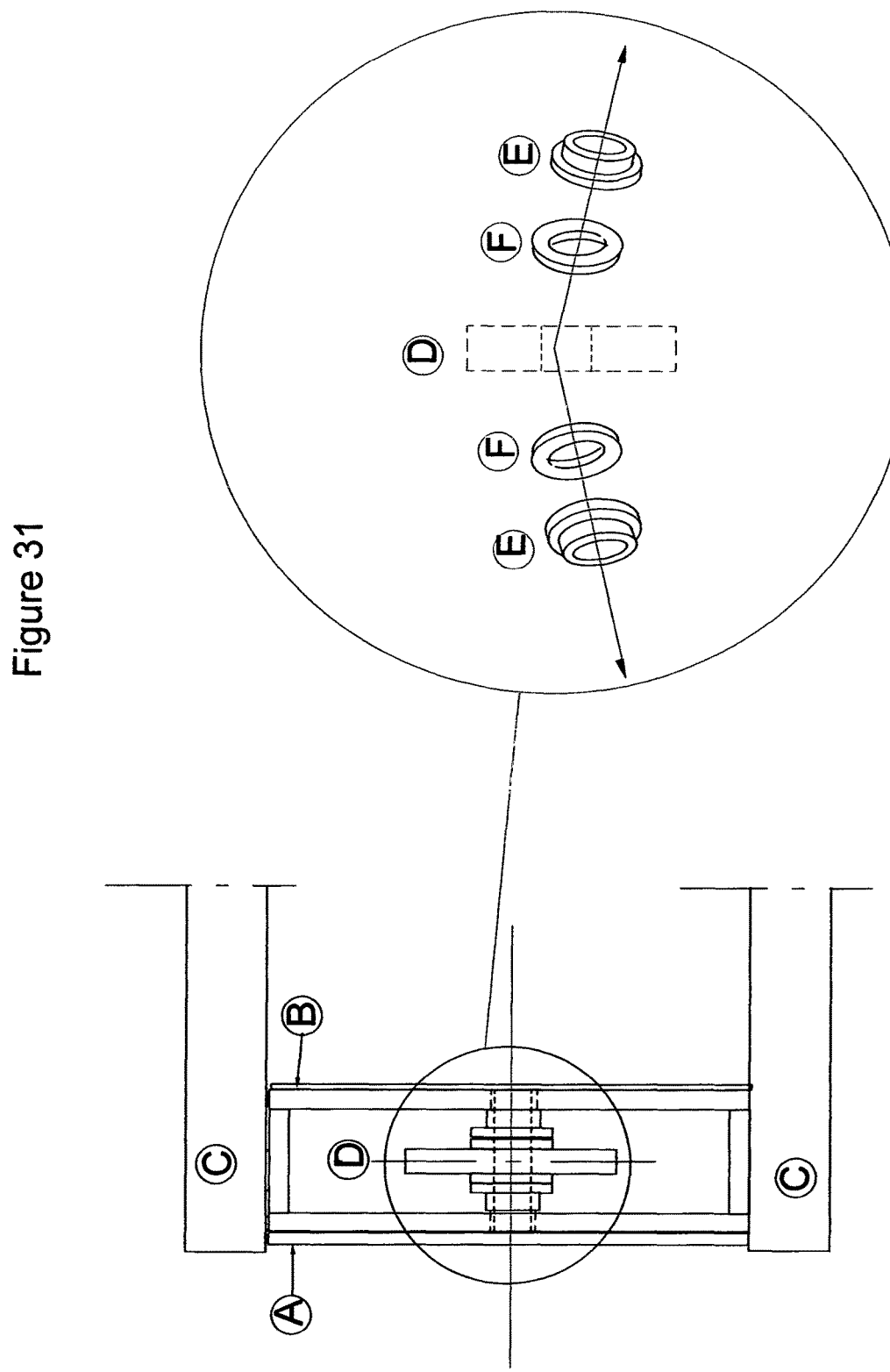

FIG. 16—Made from ⁵⁄₁₆" solid steel and cut to a very specified dimension. Smoothed, shaped and drilled at ½" before inner 3"×½" steel round rod shaft installed at 16 degrees off center and welded into center at 90 degree angle set back from front 1⅞" and placed into position in door (FIGS. 22,31)

Figure 17:
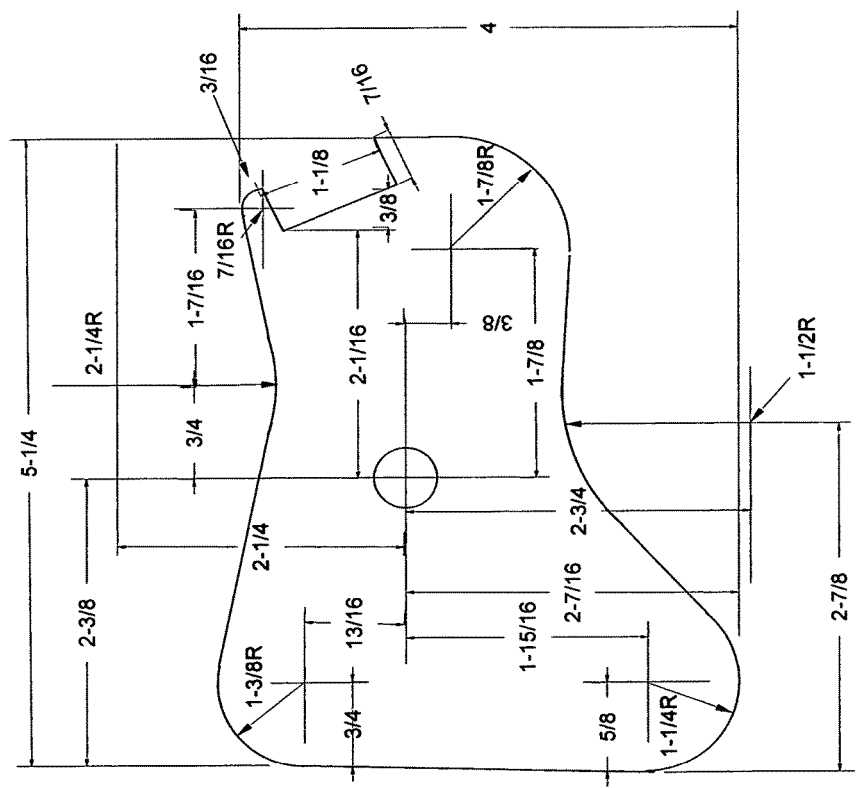
Figure 21:
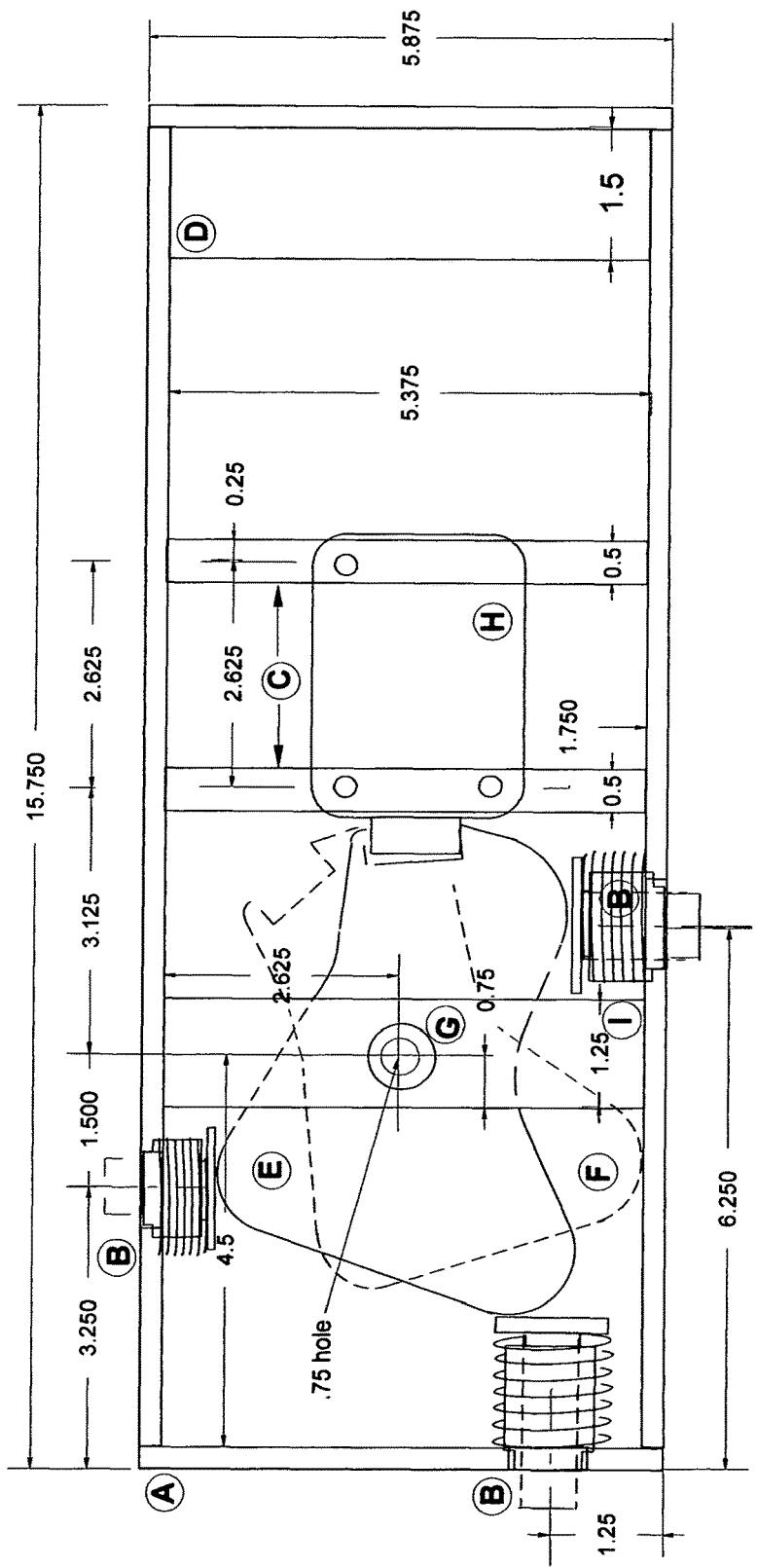

FIG. 17—Made from ⁵⁄₁₆" solid steel and cut to a very specified dimension. Smoothed shaped and drilled at ½" before inner 3"×½" steel round rod shaft installed 90 degrees to center and welded into center at 90 degrees angle set back from front 1⅞" and placed into position in door. (FIGS. 21,31)

Figure 18:
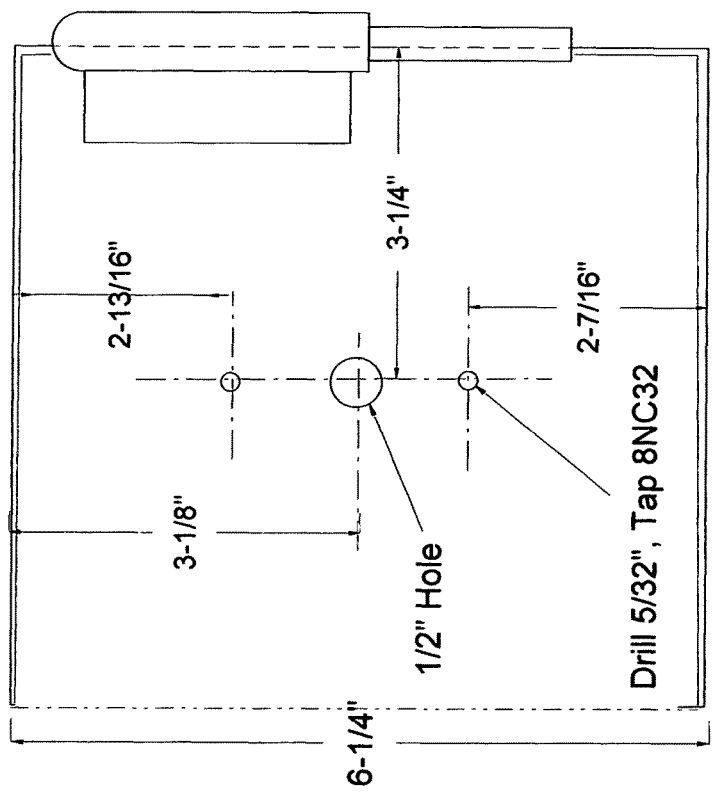

FIG. 18—Drilled and tapped at specified sizes and locations are the holes for the electronic keypad positions. Top and bottom holes are to drilled at ⁵⁄₃₂" and tapped 8NC32 while the center hole for cable to inner lock is drilled without tapping, at ½". Hole must be smoothed to keep cable from being damaged. Keypad will be installed after all paint applied.

Figure 19:
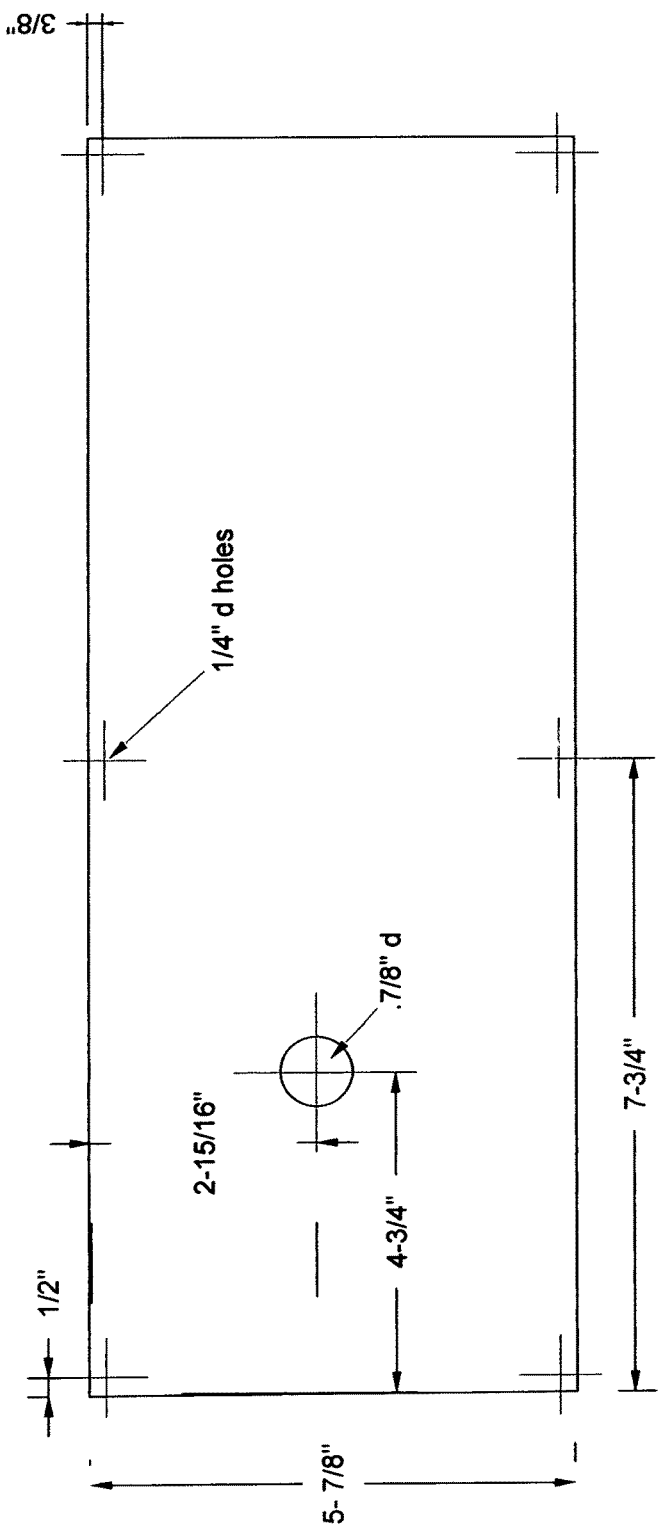

FIG. 19—Made from 18 g cold roll sheet steel cut and drilled at ⅞" for cam shaft protrusion and at specified locations ¼" holes for pop rivets. Pop rivets will be put into place incase inner door parts need repairs or replacing only after paint.

Figure 20:
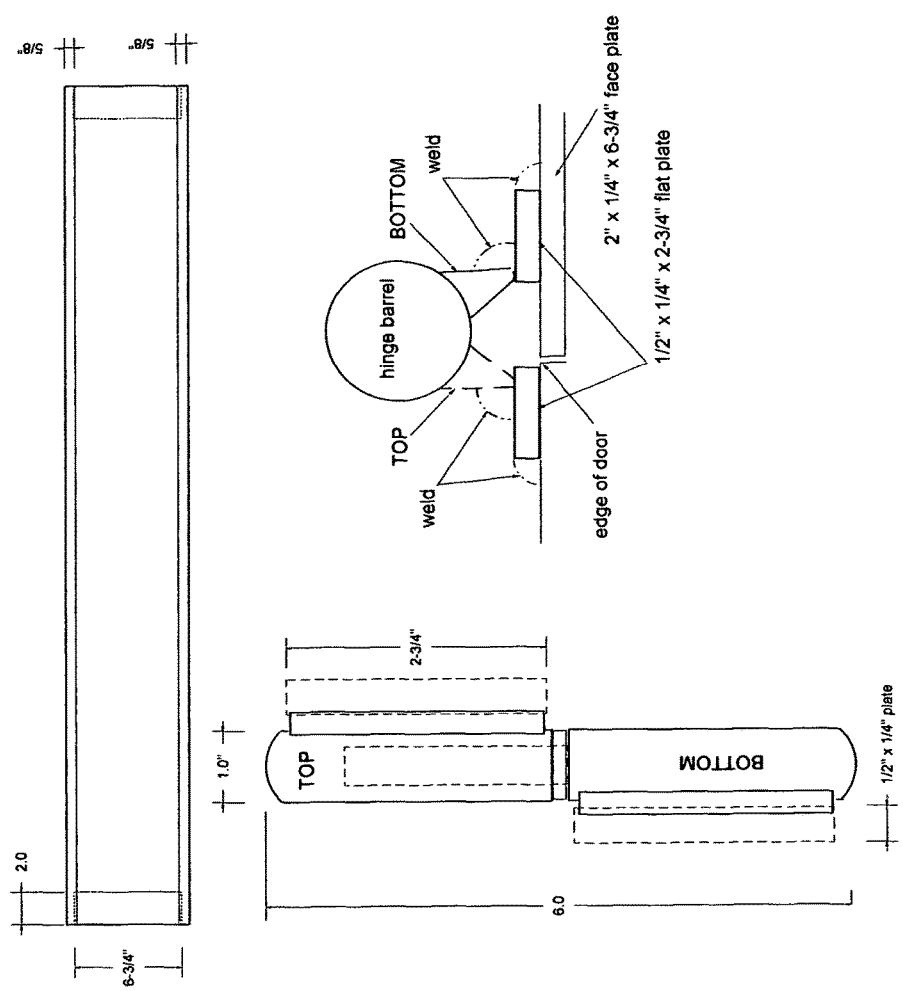

FIG. 20—Made from hardened steel, cut, shaped with use of metal lathe. Welded onto extension plates cut from ½"×¼"×2¾" flat steel plate at specified locations on doors (FIGS. 18,21) and framework face. Hinges are designed as so the doors can be lifted upward on off if repairs are needed. Only if doors are in full open position for security purposes.

FIG. 21—Now comes the framework, cam and inner lock assembly of right side door. Very complex and precision oriented.

a. Outer frame made from 1¼"×¼" flat steel bar cut to specified lengths of 15¾" for the upper and lower pieces and drilled at 1¹⁄₆₄" for lock pin sleeves (B), 2 pcs at 5.875" with one being drilled at 1¹⁄₆₄" for lock pin sleeve facing left door (FIG. 22), 2 pcs at 5.375" with two being drilled at ¾" for cam bushing and one as brace for hinge assembly (FIG. 20), 2 pcs of ½"×¼" flat bar (C) at 5.375", one drilled at 2 holes at specified locations of ¹³⁄₆₄" and tapped at ¼"-20 and 1 pc drilled at specified location of ¹³⁄₆₄" and tapped at ¼"-20 for inner lock mount. All pieces set to specified locations as per drawing and welded into place taking care to keep all welds within side of framework.

b. 1¹⁄₆₄" holes drilled for lock pin sleeves (see FIG. 29) and must be precise or pins will not line up to framework pin guide sleeves. (FIGS. 1,2)

c. ½"×¼" flat steel bar cut and drilled as per (A) for inner lock. Welded at front facing of frame as to be welded to outer door skin (FIG. 25) when installed for extra support.

d. 1¼"×¼" flat steel bar is added to front facing of frame as to be welded to outer door skin (FIG. 25) when installed for extra support of hinge (FIG. 20) when installed.

e. Cam (FIG. 17) in locked position will lock all pins (FIG. 29) into place, lock pin into left door (FIG. 22) and lock into inner locking mechanism f. Cam (FIG. 17) in open position will release all pins when inner lock is keyed open g. Hole drilled at ¾" d in outer facing and inner facing flat bar (I) with ½"×¾"×1"×½" bronze bushing for cam (FIG. 17) shaft rod to ride in (FIG. 31)

h. Inner part of locking assembly supplied by various vendors and put into place by 3, ¼"×½" allen head SS bolts.

i. 1¼"×¼" flat bar drilled (see G) and welded into place
  1. Now outer door skin (FIG. 25) can be welded into place as specified by dimensions and by specs. Must be precise here or doors will not close or open properly when hinges (FIG. 20) are added. Line up by specs and weld only on inside where door framework (FIGS. 21,22) meets outer skin.

FIG. 22—Left door framework, cam and cam lock assembly.

a. 1¼"×¼" flat steel bar is added to front facing of frame as to be welded to outer door skin (FIG. 25) when installed for extra support of hinge (FIG. 20) when installed.

B—¼"×¼" square steel bar used for a stop welded into position at specified location and at 90 degree angle to top plate C—1¼"×¼" flat steel bar for cam carriage (refer A)

D—1¹⁄₆₄" holes drilled for lock pin sleeves (see FIG. 29) and must be precise or pins will not line up to framework pin guide sleeves. (FIGS. 1,2)

E—Outer frame made from 1¼"×¼" flat steel bar cut to specified lengths of 15¾" for the upper and lower pieces and drilled at 1¹⁄₆₄" for lock pin sleeves (B), 2 pcs at 5.875" with one being drilled at 1¹⁄₆₄" for lock pin sleeve facing right door (FIG. 21), 3 pcs at 5.375" with two being drilled at ¾" for cam bushing (FIG. 31) and being drilled at ⁵⁄₁₆" for cam lock bushing (I), one as brace for hinge assembly (FIG. 20), All pieces set to specified locations as per drawing and welded into place taking care to keep all welds within side of framework.

F—Hole drilled at ¾" d in outer facing and inner facing flat bar (I) with ½"×¾"×1"×½" bronze bushing for cam (FIG. 17) shaft rod to ride in (FIG. 31)

Figure 25:
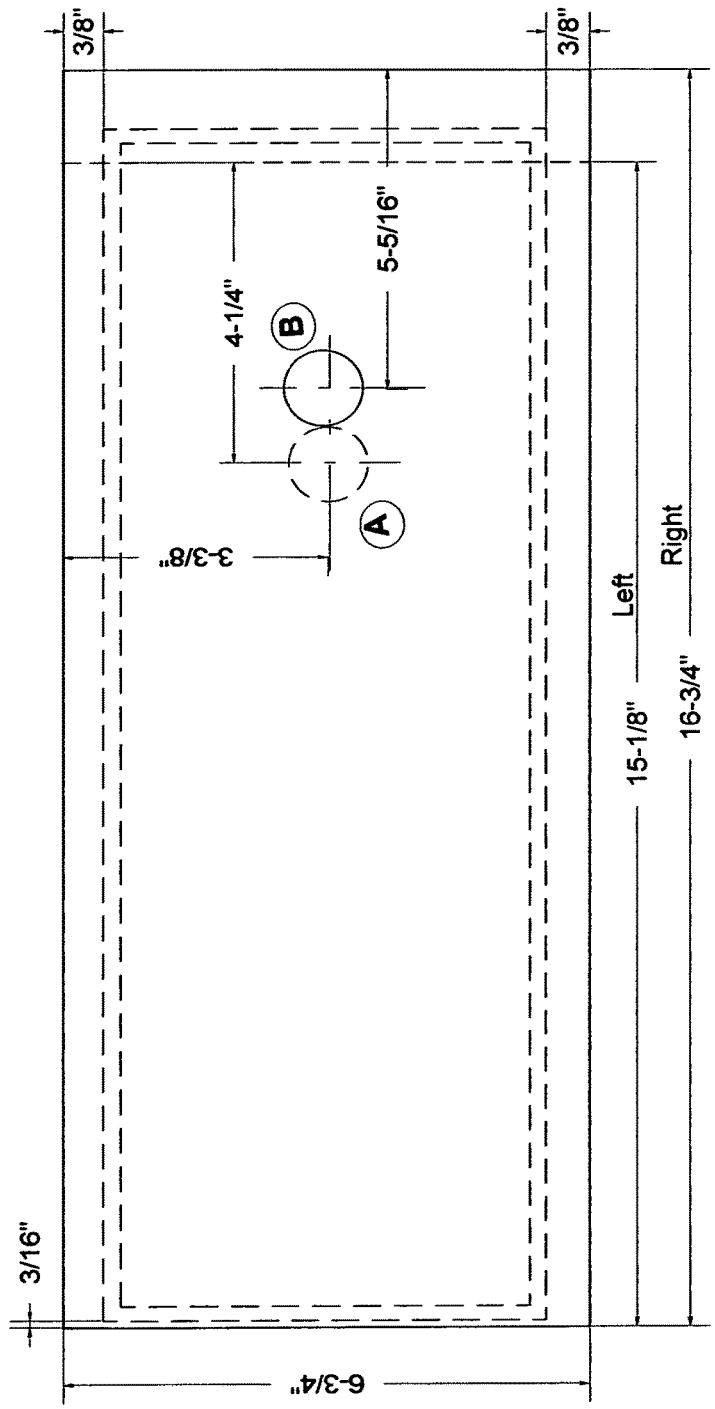
Figure 30:
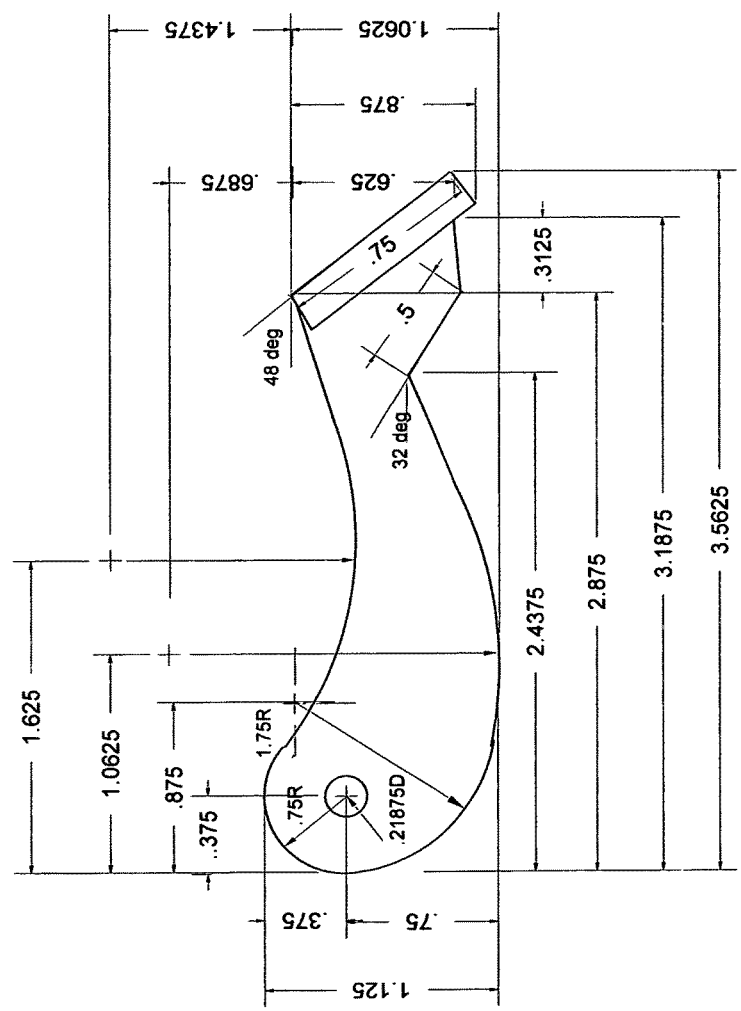

G—Mechanical cam. (see FIG. 16) Place cam with shaft into bushings and into place with locking cam (G) and bushings w/pin into place. Weld plates (C) at upper and lower points and onto outer door skin (FIG. 25). Once in place will lock all pins into lock position when right handle, turned to lock position, pushes locking pin into left door locking pin, thereby pushing pin into locking cam (FIG. 30) and locking mechanical cam (G) into locked position. Will hold in place until right door lock is released and right door handle in open position.

H—Mechanical locking cam bar (see FIG. 30) is placed into position and described in (G)

I—Hole drilled at 5/16" for 5/16"×¼"×5/16" bronze bushing and pin for locking cam position. Once holes drilled to specified locations, place locking cam with bushings into place and weld as described in (G). Once in place and welded place pin through hole and weld on backside. Grind and clean weld so will not interfere with inner door skin (FIG. 19)

i. Now outer door skin (FIG. 25) can be welded into place as specified by dimensions and by specs. Must be precise here or doors will not close or open properly when hinges (FIG. 20) are added. Line up by specs and weld only on inside where door framework (FIGS. 21,22) meets outer skin.

Figure 23:
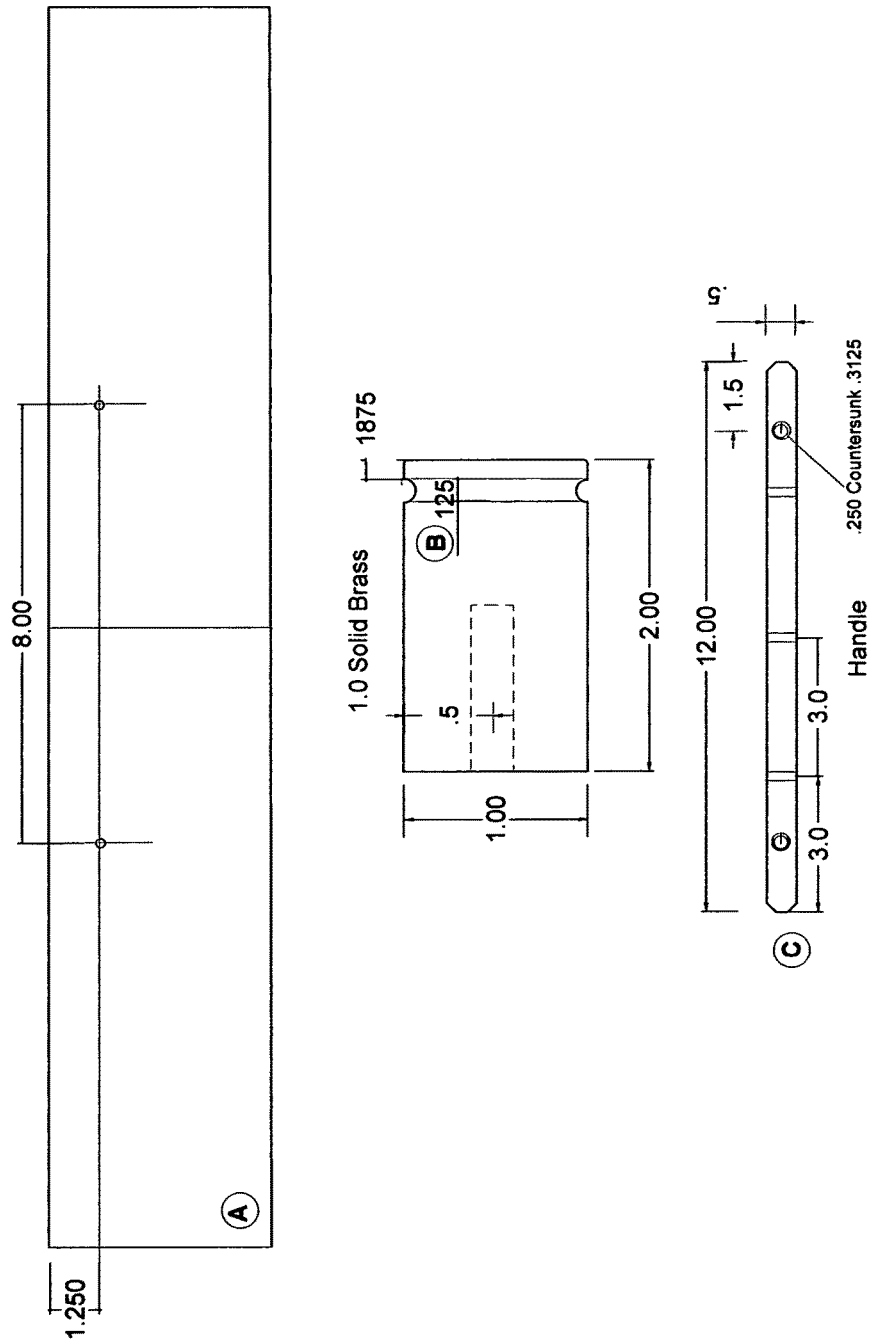

FIG. 23—Then comes the finishing of inner drawer by cutting and turning the pieces of handle on lathe and drilling hole locations as described set forth.

a. Drawer front view and handle holes locations must be below inner framework of drawer and holes are drilled at ¼" d at 4" form center left and right and 1¼" from top. Clean holes and prep for handle install after paint.
   b. Handle base made from 1" d solid brass rod shaped to specified dimensions
      i. Cut rod to 2"×1" and set back from bottom 0.1875" with a 0.125" inset as to give appearance of bullet bottom. Drill into center top, 13/64" d hole 0.75" in depth and tap ¼"-20 in each of two handle bases. Once (C) is complete, bolt onto to and place on drawer (A) using two ¼"-20×0.75" allen head bolt after paint.
   c. Handle made from copper coated steel. Shaped and drilled to specified dimensions Cut piece 12"×½". Place in lathe and at center point of 6" and 3" to left and right of center point, knurl at depth of 0.125. Measure 1½" from each end inward and drill at center point of ¼" a 0.3125" hole with 45 degree counter sink at 0.250. Once drilled, bevel each end at 45 degrees and dress up. Assemble to base (B) and then to drawer (A) only after paint.

Figure 24:
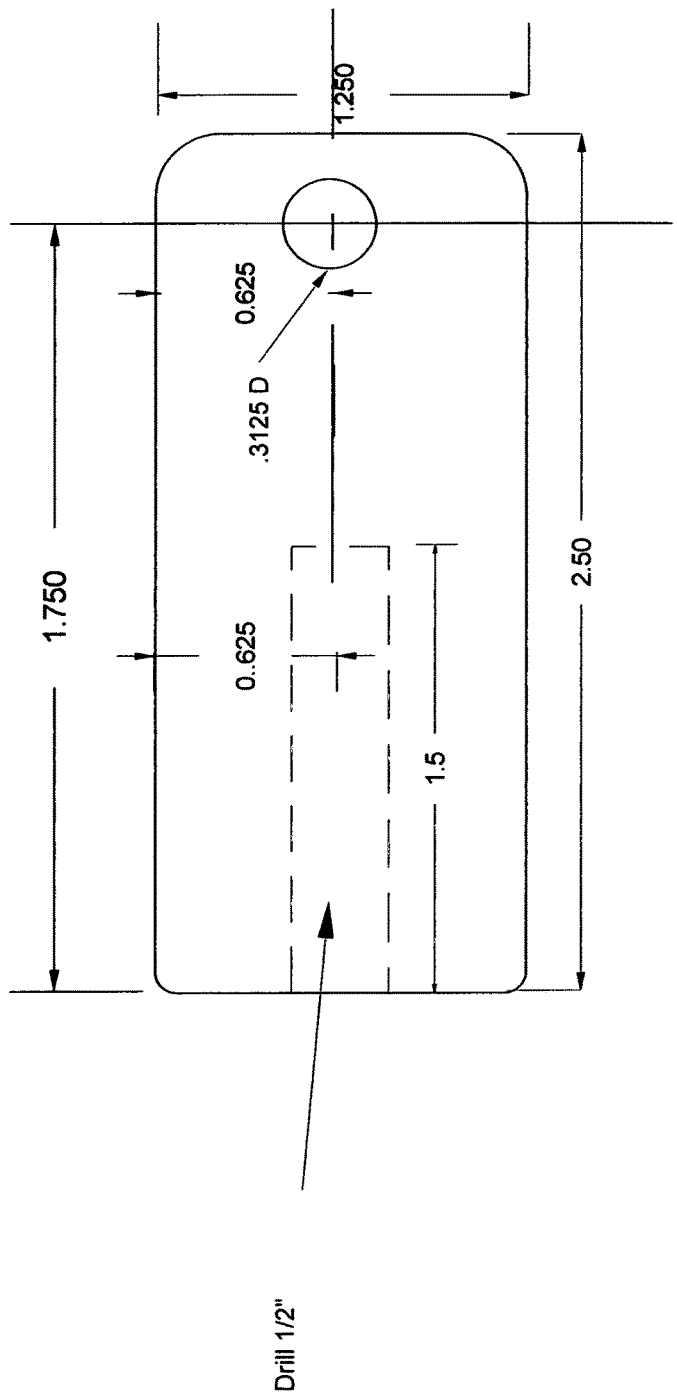
Figure 26:
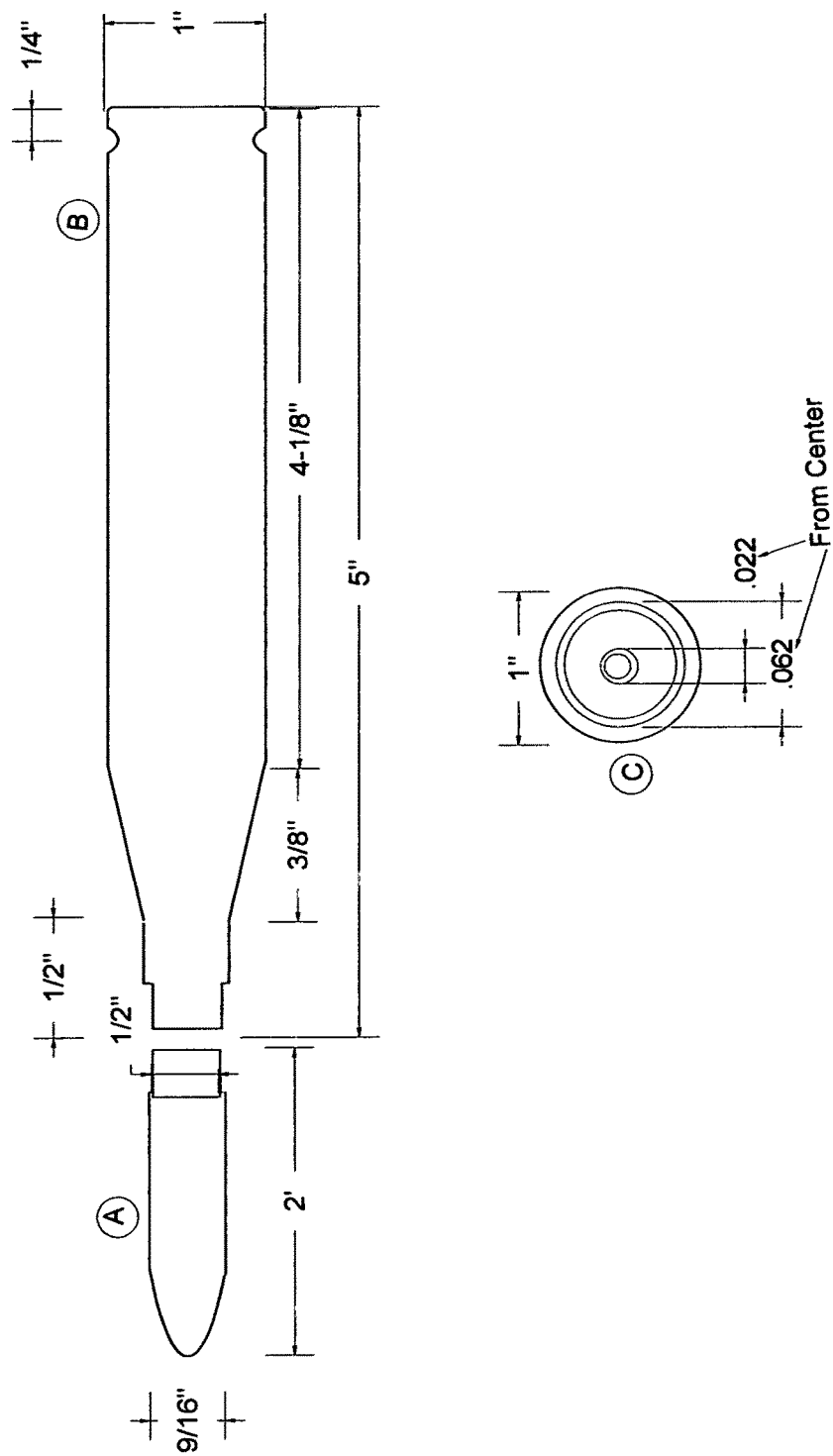

FIG. 24—Made from 304 stainless steel and cut, shaped and polished from specified dimensions. Cut down to 1¼"×2½", polished and edges rounded by 0.1875". From front edge, measure back ¾" and center at 0.625" and then drill at 0.3215" for bullet handle (FIG. 26, A) and tip (FIG. 26, B). From bottom end, 0.625 to center of turret, drill ½" hole at 1½" depth for cam shaft. Assemble on to door assembly after handle and tip are tapped into place and paint.

FIG. 25—Outer door skins made from 3/16" cold roll flat steel. Cut to specified dimensions and outer edges beveled to 45 degrees. Holes drilled for cam to handle locations.

a. Left door hole locations drilled at 1 1/64" and edges beveled at 45 degrees at 0.1875 depth. Once skins are drilled and beveled can be installed onto door assembly (FIG. 22)
   b. Right door hole location drilled at 1 1/64" and edges beveled at 45 degrees at 0.1875 depth. Once skins are drilled and beveled can be installed onto door assembly (FIG. 22)

FIG. 26—Bullet shaped handle pieces.

a. Tip made from copper coated steel turned down and shaped to specified dimensions. Cut at 2"×9/16" and set back one end at ⅜" in and turn down on lathe to ½". Bevel one end at 45 degrees at 0.250" depth. Once all cuts are made can be tapped into handle turret (FIG. 24).
   b. Handle made from 1" solid brass bar turned down and shaped to specified dimensions. Cut at 1"×5" and shape one end (B) by measuring back ¼" and beveling down 0.1875". The other end (A) must measure back ⅞" tapering down ⅜" to front at 60 degree angle to stop at ½" from end. Measure back from end ⅜" and turn down to ½". On bottom (B) end of handle measure out from center 0.022 and bevel down 0.125 and measure 0.062 and bevel down 0.125. Once all cuts are made can be tapped into handle turret (FIG. 24).

Figure 27:
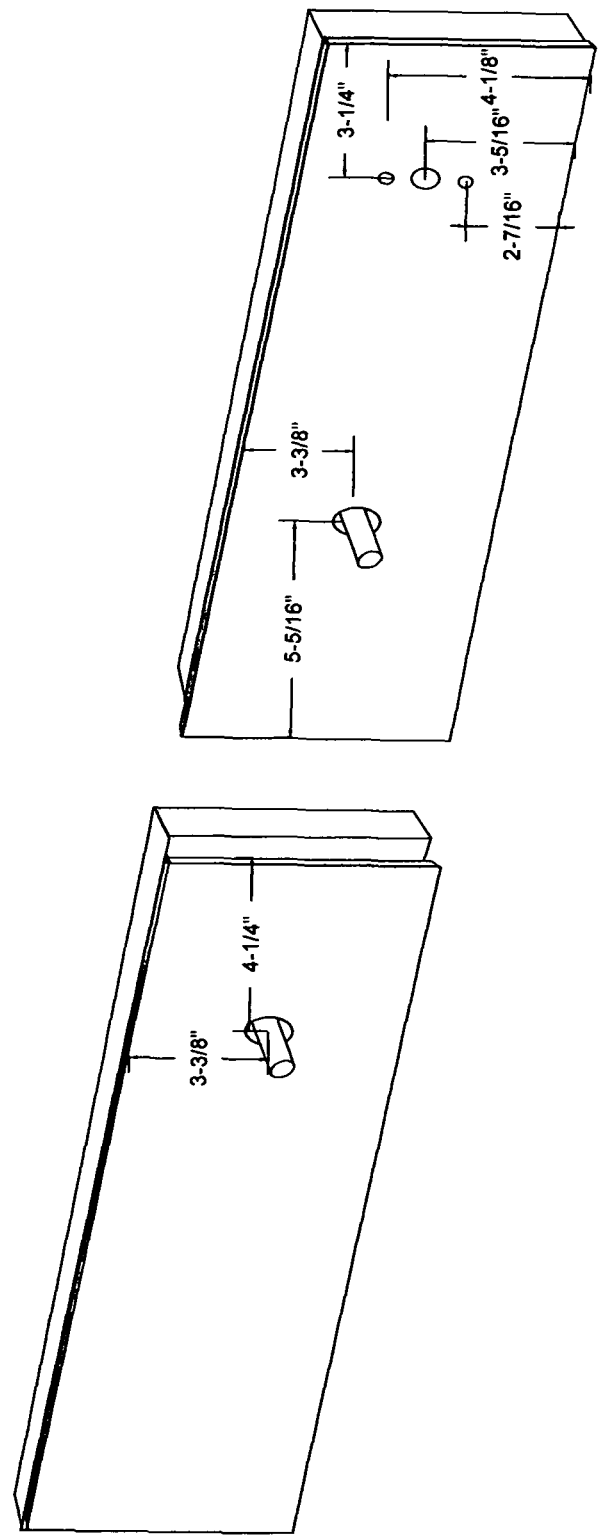

FIG. 27—Door assembly view. Right door overlaps left door at 1" for security purposes and strength keeping both door skins level across.

Figure 28:
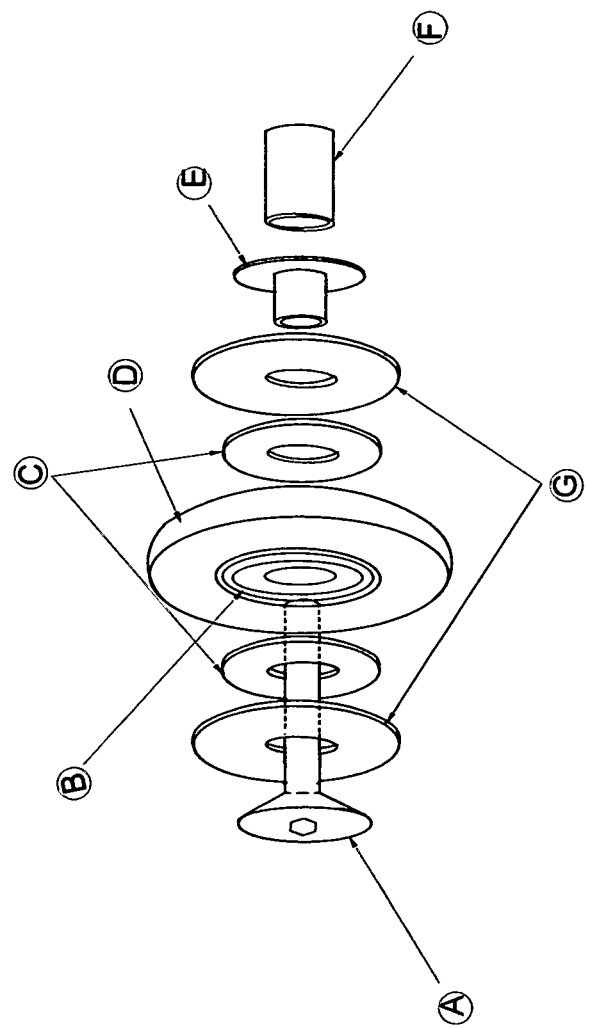

FIG. 28—There are 14 wheel assemblies for drawer. Each is made to fit the shape of safe. Some has more washer spacers than others.

a. 1½"×¼" Hex head tapered SS bolt is used so head of bolt does not rub inner wall.
   b. ⅞"×¼"×5/16" SS sealed bearing is installed into urethane wheel (D)
   c. 304 SS 5/16"×¾" Fender washers used to keep wheels from rubbing or locking down.
   d. ¼"×2" High heat Urethane Wheel are cut from solid urethane rod stock and smoothed.
   e. ¼"-20×5/16" brad hole T nuts are used in conjunction with bolt (A) to keep from locking down bearing and hold assembly together
   f. 5/16"×9/16"×¼" copper spacer are made from same as drawer handles (FIG. 23) copper coated steel and are used for spacing wheels to drawer and looks.
   g. 1½"×5/16" SS flat washers are used as spacers and as stated are used to justify each wheel spacing.

Figure 29:
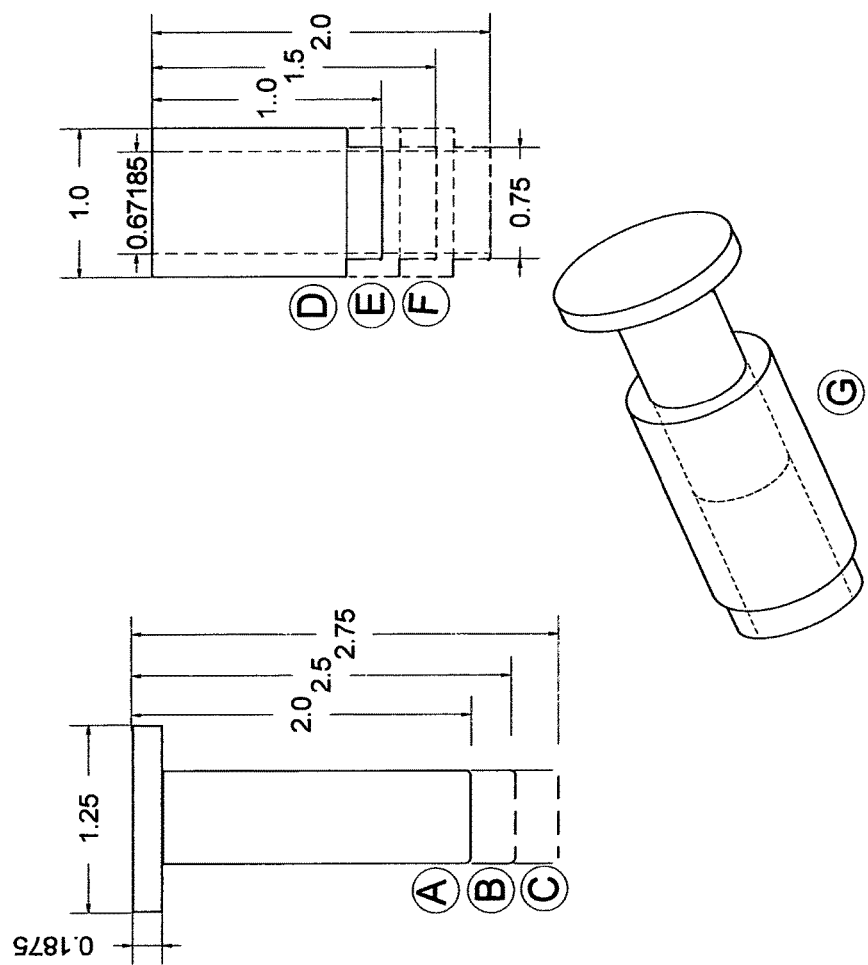

FIG. 29—Locking pins and sleeves made from 304 SS bar turned down to specified dimensions. Fit into door frames and sub frames (FIGS. 1,2,21,22)

a. Cut at 2" length with 1.25" top head w/0.625 shaft turned down
   b. Cut at 2.5" length with 1.25" top head w/0.625 shaft turned down
   c. Cut at 2.75" length with 1.25" top head w/0.625 shaft turned down
   d. Cut at 1.0" length cut back to 0.75" w/0.25 cut back at bottom w/0.67185 hole
   e. Cut at 1.5" length cut back to 0.75" w/0.25 cut back at bottom w/0.67185 hole
   f. Cut at 2.0" length cut back to 0.75" w/0.25 cut back at bottom w/0.67185 hole
   g. Representative example of pin in sleeve FIG. 30—View of cam lock for the left door cam. Cam lock is made using a tracing cutter of my design as well as cutting right cam and left cam. Made from 5/16" flat sheet. Once cut has to be trimmed, shaped and ground to smoothness. Has to be well in specs to operate properly. Function: Once the handle is turned to close, locks cam (FIG. 16) and pins (FIG. 29) into place when right door is engaged into locking position with pin protruding into left door lock.

FIG. 31—Cutaway view of door with cam, bronze bushings and spacers. Also, outer and inner door skins and framework.
 a. Outer 3/16" door skin made from cold roll steel sheet
 b. Inner door skin made from 18 g cold roll steel sheet
 c. Upper and lower framework made from 2"×1"×14 g steel tubing
 d. Representative cam
 e. 1/2"×3/4"×1"×1/2" bronze bushing
 f. 1/16"×1"×1/2" SS washer spacer What has been described and illustrated herein is a preferred embodiment of the invention. The terms, descriptions and figures used herein are set forth by way of illustration only and are not meant by limitations. Those skilled in the art will recognize that many variations are possible within the spirit and scope of the invention, which is intended to be defined by the following claims. Any headings utilized within the description are for convenience only and have no legal or limiting effect.

I claim:

1. A hide away safe comprising of a upper inner and upper outer wall, attached bottom inner and bottom outer wall, attached left inner wall and left outer wall, attached rear inner and rear outer wall, attached right inner and right outer wall, attached inner sub structure between said upper, bottom, right, left and rear inner and outer walls, attached outer framework at point said outer side walls, said outer upper wall, said outer bottom wall, said outer rear wall join to produce a structure having an interior storage space with two hinged, removable doors attached at said upper, said bottom, said sides and together to lock in said interior open space, said safe further comprising:
 a mechanical lock system for the locking and unlocking said hinged, removable doors from said structure
 a solid brass, bullet shaped handle to move said mechanical system and said hinged, removable door to a open or closed position
 a inner removable drawer for storing valuables having urethane wheels mounted either side, brass and stainless steel bullet handle mounted on front facing wall with removable stop pins for releasing drawer for removal from said interior storage space.

2. A hide away safe of claim 1, wherein said removable, hinged doors each having three locking ports consisting of, stainless steel collars 1 inch Outside Dimension×5/8 inch Inside Dimension, with set back of 1/8 inch×1/4 inch at bottom, welded into drilled inner door frame having one at the top of said door frame, one at bottom of said door frame and one at said door frame side facing opposing said door frame having stainless steel tapered headed, spring loaded lock pins mounted inside of said collars at various sizes depending on location, wherein said handle is turned to lock position, steel locking cam located in said right door, contacts said lock pins protruding them outward from door contacting and inserting said pins into stainless steel collars 1 inch×1 inch Outside Dimension×5/8 inch Inside Dimension, welded into drilled, said upper inner sub frame, said bottom inner sub frame, said side facing opposing door frames making up cam lock in left door securing all locking points thus securing contents of said hide away safe.

3. A hide away safe of claim 2, wherein said hinged removable doors, said upper inner and outer walls, said right inner and outer walls, said left inner and outer walls, said bottom inner and outer walls, said rear inner and outer walls, each between said inner sub structure voids and inner and outer wall voids are compacted with a ceramic fiber insulation rated at 2800 degrees and burn point at 3600 degrees F. for a quality fire protection of said interior space and said removable drawer.

4. A hide away safe of claim 3, wherein said mechanical lock system includes an electronic keypad system for the final locking point.

5. A hide away safe of claim 2, wherein said removable hinged doors have a tapered edge along face of outer skins as to aide in prevention of pry points, having extended edges that cover face of said structure sub frame, further preventing access to contact with said lock pins in said doors, extended edge on right facing side of said right door skin as to overlap onto cut back portion of said left door skin and frame, thus preventing access to said door lock pin that passes between said right door and said left door when said handles are turned to lock position.

6. A hide away safe of claim 1, wherein a track system consisting of 3/4 inch angle iron welded to a 1 1/4 inch×1/8 inch flat steel and welded the full length of both said inner right wall and said inner left wall, whereby said inner removable drawer can travel inward and outward of said structure, stop points for said drawer are welded at specific points below and at start of said track system.

7. A hide away safe of claim 1, wherein said removable inner drawer with a right wall, a left wall, a front wall, a rear wall and a bottom wall, having individual wheel assemblies in fourteen locations, seven at said right wall and seven at said left wall in specific locations, with removable lock pegs at specific locations at said right wall and said left wall, when said pegs are bolted into place and protruding through said sides of drawer, contact with stop points inside of interior storage space placed at specific points below said drawer track system, prevents said drawer form being removed from said structure, when said pegs are removed and said drawer is removed form said structure, two access points in bottom of said structure at specific points can be obtained to bolt said hide away safe to any desired structure for maximum security.

8. A hide away safe of claim 7, wherein said wheel assemblies consist of 90 A urethane with stainless steel bearings, stainless steel axles, stainless steel lock nuts, stainless steel washers, stainless steel T nuts, with three said wheel assemblies at said right wall drawer rear, three said wheel assemblies at said left wall drawer rear to carry weight when said drawer is in full open position with said stop pegs in place, two said wheel assemblies at said right wall drawer front, two said wheel assemblies at said left wall drawer front as guides, two said wheel assemblies spaced each at specific locations both right and left side of said drawer sides between said rear and front wheel assemblies locations.

9. A hide away safe of claim 1, wherein all said structure components, said hinged removable door components, said inner removable drawer are made of steel of various sizes, said door and said inner drawer handles are made from brass, copper and stainless steel.

* * * * *